(12) United States Patent
Kight et al.

(10) Patent No.: US 7,383,226 B2
(45) Date of Patent: Jun. 3, 2008

(54) INTEGRATED ELECTRONIC BILL PRESENTMENT AND RISK BASED PAYMENT

(75) Inventors: Peter J. Kight, Alpharetta, GA (US); William C. Kitchen, Westerville, OH (US); Mark A. Johnson, Duluth, GA (US)

(73) Assignee: CheckFree Corporation, Norcross, GA (US)

( * ) Notice: Subject to any disclaimer, the term of this patent is extended or adjusted under 35 U.S.C. 154(b) by 0 days.

(21) Appl. No.: 10/608,548

(22) Filed: Dec. 1, 2003

(65) Prior Publication Data

US 2004/0078329 A1 Apr. 22, 2004

Related U.S. Application Data

(60) Continuation-in-part of application No. 09/795,314, filed on Mar. 1, 2001, which is a division of application No. 09/034,561, filed on Mar. 3, 1998, now Pat. No. 6,289,322.

(51) Int. Cl.
G06Q 40/00 (2006.01)
(52) U.S. Cl. ..................................... 705/40
(58) Field of Classification Search .................. 705/35, 705/37, 39–42
See application file for complete search history.

(56) References Cited

U.S. PATENT DOCUMENTS

| | | | |
|---|---|---|---|
| 4,484,328 A | 11/1984 | Schlafly |
| 4,649,563 A | 3/1987 | Riskin |
| 4,734,858 A | 3/1988 | Schlafly |
| 4,745,559 A | 5/1988 | Willis et al. |
| 4,799,156 A | 1/1989 | Shavit et al. |
| 4,823,264 A | 4/1989 | Deming |
| 4,882,675 A | 11/1989 | Nichtberger et al. |
| 4,947,028 A | 8/1990 | Gorog |
| 4,974,878 A | 12/1990 | Josephson |
| 5,007,084 A | 4/1991 | Materna et al. |
| 5,025,373 A | 6/1991 | Keyser, Jr. et al. |
| 5,121,945 A | 6/1992 | Thomson et al. |

(Continued)

FOREIGN PATENT DOCUMENTS

GB 2294566 5/1996

OTHER PUBLICATIONS

Anita Malnig, Roundup of Financial Software: Home Accountant, pp. 73-74, II Computing, vol. 1, No. 3, Feb. 1986.

(Continued)

Primary Examiner—Hani M. Kazimi
(74) Attorney, Agent, or Firm—Sutherland, Asbill & Brennan LLP

(57) ABSTRACT

To electronically present and pay bills, bill information representing a plurality of bills of a plurality of billers for a plurality of payors is transmitted to the plurality of payors. The transmitted bill information includes first information representing a first of the plurality of bills of a first of the plurality of billers for a first of the plurality of payors. A payment instruction from the first payor to pay the first bill, based on the transmitted first information, is received. A risk associated with payment of the first bill is determined and a debit type is selected based upon the determined risk. A payment of the first bill to the first biller is initiated based on the received payment instruction and to the selected debit type.

21 Claims, 27 Drawing Sheets

U.S. PATENT DOCUMENTS

| | | | |
|---|---|---|---|
| 5,220,501 A | 6/1993 | Lawlor et al. | |
| 5,265,008 A | 11/1993 | Benton et al. | |
| 5,283,829 A | 2/1994 | Anderson | |
| 5,287,270 A | 2/1994 | Hardy et al. | |
| 5,325,290 A | 6/1994 | Cauffman et al. | |
| 5,326,959 A | 7/1994 | Perazza | |
| 5,383,113 A | 1/1995 | Kight et al. | |
| 5,465,206 A | 11/1995 | Hilt et al. | |
| 5,473,143 A | 12/1995 | Vak et al. | |
| 5,483,445 A | 1/1996 | Pickering | |
| 5,496,991 A | 3/1996 | Delfer, III et al. | |
| 5,649,117 A | 7/1997 | Landry | |
| 5,649,118 A * | 7/1997 | Carlisle et al. | 705/41 |
| 5,684,965 A | 11/1997 | Pickering | |
| 5,699,528 A | 12/1997 | Hogan | |
| 5,794,221 A | 8/1998 | Egendorf | |
| 5,832,460 A | 11/1998 | Bednar et al. | |
| 5,873,072 A | 2/1999 | Kight et al. | |
| 5,884,288 A | 3/1999 | Chang et al. | |
| 5,930,759 A | 7/1999 | Moore et al. | |
| 5,943,656 A | 8/1999 | Crooks et al. | |
| 5,956,700 A | 9/1999 | Landry | |
| 5,963,925 A | 10/1999 | Kolling et al. | |
| 5,978,780 A * | 11/1999 | Watson | 705/40 |
| 6,035,285 A | 3/2000 | Schlect et al. | |
| 6,044,362 A | 3/2000 | Neely | |
| 6,052,674 A | 4/2000 | Zervides et al. | |
| 6,055,567 A | 4/2000 | Ganesan et al. | |
| 6,070,150 A | 5/2000 | Remington et al. | |
| 6,078,907 A | 6/2000 | Lamm | |
| 6,128,603 A * | 10/2000 | Dent et al. | 705/40 |
| 6,188,994 B1 | 2/2001 | Egendorf | |
| 6,285,991 B1 | 9/2001 | Powar | |
| 6,289,322 B1 | 9/2001 | Kitchen et al. | |
| 6,292,789 B1 | 9/2001 | Schutzer | |

OTHER PUBLICATIONS

Sharon Gamble Rue, Electronic Checkbook, Machintosh Buyer's Guide, p. 128/1, 5/85, Abstract from Microsearch AN: 85-028312.

Tracie Forman Hines, The Check is in the Modem, MacUser vol. 1, p. 6815; 10185 Abstract from Microsearch AN: 85-028676.

Myte Myke Business System: Order-Entry Billing, Product Literature, Abstract from Microsearch file of Orbit, AN: 87-039522.

Rovert B. Willemstad, Home Banking: A Case Study pp. 4R 55, Banker's Magazine Nov.-Dec. 1984.

Open Financial Exchange Bill Presentment, Jun. 12, 1997, 1997 CheckFree Corp., Intuit Inc., Microsoft Corp. pp. 312-356.

* cited by examiner

Enrollment Select Biller

```
*Please Select*                    ▲
*Please Select*
BELLSOUTH TELECOMMUNICA
CAPSTEAD MORTGAGE *          ─ 565
CONSUMERS ENERGY
CUNA MUTUAL GROUP
Columbia Gas of Ohio *
Florida Power & Light
GPU ELECTRIC PENELEC *
GPU ENERGY JCPL
CPU ENERGY METED
Portland General Electric
SMALL BUSINESS ADMINISTRA
```
560

ACCT NO.
562

PLEASE INSERT
BILLER NAME
BILLER ADDRESS
ACCT NO.
570

Enrollment Personal Information

510  First Name    MI    Last Name

520  Social Security #    Mother's Maiden Name
                                                525

Street Address
530
City            State              Zip
                'Please Select' ▼

Home Phone       Work Phone
              540

Figure 6:
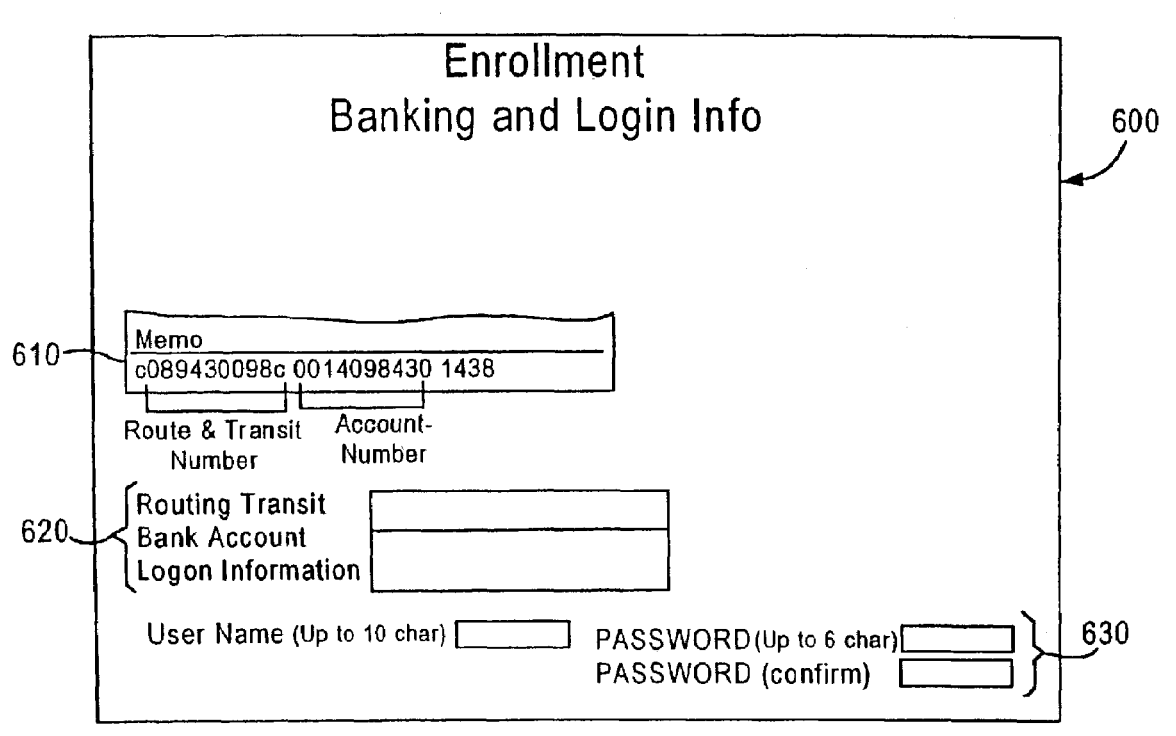

Enrollment
Banking and Login Info

610 — Memo
c089430098c 0014098430 1438

Route & Transit Number | Account Number

620 — { Routing Transit
Bank Account
Logon Information }

User Name (Up to 10 char) [ ]   PASSWORD (Up to 6 char) [ ]
                                PASSWORD (confirm) [ ]     } 630

```
1120      1125
  PAY    DELETE
BELLSOUTH              ELECTRONIC BILLING NOTICE
```

| TOTAL PAYMENT $228.40 | John Riley |
|---|---|
| DUE DATE September 10, 1998 | 1234 Main Street Anytown, USA 65434 |

BELLSOUTH  Account Number:  770 555-1247 240 1886
                Bill Period Date:  September 1, 1998

Summary of Charges

Current Charges
BellSouth
    Monthly Service Charges ............................................219.96
    Other Charges and Credits ........................................ 1.20
    Itemized Calls ............................................................ 2.61
    Taxes ........................................................................ 4.63
Total Current Charges for BellSouth Companies ............... 228.40
Total Current Charges Due Before Mar 4 ........................ 228.40
    Total Current Charges include the following amounts:
    Regulated Charges .............................. 65.74
    Nonregulated Charges ........................ 162.66
Total Amount Due ................................................................ 228.40

FIG. 11

Payment List

Payment List ≡[?]

| Biller | Date | Amount | Recurrence | Confirm # | Status | Action |
|---|---|---|---|---|---|---|
| Lakewood Racquet Club | 10/25/1997 | 105.00 | Monthly | WPBI-3M55021QJ | Pending | Stop/Edit |
| Lakewood Racquet Club | 09/25/1997 | 105.00 | Monthly | WPBI-3M55-21QJ | Processed: 09/22/1997 Check #. E-Pay | Inquire |
| Kim Heyde | 09/10/1997 | 1.00 | | WPBI-4010-36EC | Processed: 09/22/1997 Check #. E-Pay | Inquire |
| 1310 | 1315 | 1320 | 1325 | 1330 | 1335 | 1340 |

FIG. 13

INTEGRATED ELECTRONIC BILL PRESENTMENT AND RISK BASED PAYMENT

RELATED APPLICATIONS

This application is a continuation-in-part of U.S. application Ser. No. 09/795,314 entitled "Electronic Bill Processing with Enhanced Bill Availability Notification and/or Enhanced Bill Presentation", filed Mar. 1, 2001, which is a division of U.S. application Ser. No. 09/034,561 entitled "Electronic Bill Processing", filed Mar. 3, 1998 (now U.S. Pat. No. 6,289,322, issued Sept. 11, 2001). Pending U.S. application Ser. No. 09/795,314 is incorporated herein by reference in its entirety.

This application is also related to U.S. application Ser. No. 10/608,413, entitled "INTEGRATED ELECTRONIC BILL PRESENTMENT AND UNIVERSAL PAYMENT", filed Jun. 30, 2003; U.S. application Ser. No. 10/608,420, entitled "FLEXIBLE INTEGRATED ELECTRONIC BILL PRESENTMENT AND PAYMENT", filed Jun. 30, 2003; U.S. application Ser. No. 10/608,414, entitled "INTEGRATED ELECTRONIC BILL PRESENTMENT AND PAYMENT", filed Jun. 30, 2003; U.S. application Ser. No. 10/608,439, entitled "INTEGRATED ELECTRONIC BILL PRESENTMENT AND PAYMENT WITH IMPROVED ACTIVATION", filed Jun. 30, 2003; and U.S. application Ser. No. 10/608,433, entitled "SYSTEM AND METHOD FOR BILL DELIVERY AND PAYMENT OVER A COMMUNICATIONS NETWORK", filed Jun. 30, 2003. Additionally, pending U.S. application Ser. No. 09/250,711 entitled "System And Method For Electronically Providing Customer Services Including Payment Of Bills, Financial Analysis And Loans", filed Feb. 16, 1999, is incorporated herein by reference in its entirety.

TECHNICAL FIELD

The present invention relates generally to electronic commerce and more particularly to integrated electronic presentation and payment of bills from different billers.

BACKGROUND ART

Historically the billing process has been a three party process. More particularly, the typical billing process consists of billers, such as merchants, utility companies, service providers and bankcard companies, preparing hardcopy paper bills either directly or through an independent bill preparation service provider. The bills normally consist of detailed billing information relating to the goods or services purchased or ordered, including a detailed itemization of the billed charges. The billing information also includes the total charge, due date for payment and, in many cases, the minimum amount which must be paid by the due date.

The hardcopy billing information relating to each individual biller is then placed in a separate envelope and mailed through the postal service to the applicable payor. The envelope may also be stuffed with other materials such as other product offerings, e.g., special discounts or new goods or services. Hence, each payor has historically received billing information from each biller as an individual hardcopy piece of correspondence received by mail.

Most, although not all, billers bill on a periodic basis, such as each calendar month or every thirty days. However, although billers may issue bills covering similar periods of time, e.g., thirty day periods, individual billers may have billing cycles and bill issue dates which vary. For example, some monthly billers may have a billing period which extends from the fifteenth of one month to the fifteenth of the next month, while other billers may have a monthly billing period which extends from the last day of one month to the last day of the following month. Further, even if different billers bill charges incurred over identical periods, the issue dates of the bills can vary widely. Accordingly, payors typically receive bills at various times throughout, for example, any given calendar month.

Payors continue to receive large numbers of hardcopy paper bills from individual billers. Hence, bill presentment has remained a tedious and expensive task both in terms of the preparation and the distribution of billing information.

To complete the billing process individual payors have historically made payments directly to each individual biller by hardcopy paper check drawn against a financial institution and mailed via the postal service to the biller's remittance center. A returnable portion of the billing information received from the biller is typically returned with the check. The biller must then present the check for payment through the payor's financial institution before the payment funds can be actually received by the biller and applied against the payors account.

For example, it has been common for many years for consumers to pay monthly bills byway of a personal check written by the consumer and sent by mail to the entity from which the bill or invoice was received. Consumers have used other ways to pay bills, including personally visiting the billing entity to make a cash payment. In today's economy, it is not unusual for a consumer to have several regular monthly invoices to pay. Writing individual checks to pay each invoice can be time-consuming and costly due to postage and other related expenses.

Accordingly, a need exists for a method whereby a consumer can contact a single source and inform the source to pay various bills of the consumer, to have the source adjust the consumer's account with the consumer's financial institution (ie., bank, credit union, savings and loan association, etc.) to reflect a bill payment, and to actually pay the billing entity a specified amount by a particular time. The system should be efficient and not unreasonably expensive and relatively simple for a consumer to interact with.

Some banks have attempted to provide a service for making payment to a few billing entities to which the banks have established relations. The banks that do provide that type of service are limited in that they provide the service only for their own customers since the banks have not developed a system for accurately acquiring and processing account numbers and balances of customers of all other banking institutions and coordinating that information with bill payment. Furthermore, banks have not developed a system for managing the risks involved in providing such a service and the inherent complexities of providing the service to consumers other than the bank's own customers.

Therefore, a need exists for a single source system that would be available to any consumer, regardless of where the consumer banks and regardless of what bills are to be paid.

Accordingly, it is an object of the present invention to provide a technique for electronically presenting billing information in a manner which facilitates the timely payment of bills by payors.

SUMMARY DISCLOSURE OF THE INVENTION

The present invention is designed to fulfill the above listed needs. The invention provides a universal system that works regardless of the consumer's financial institution and bill to be paid. The present invention provides a computerized system by which a consumer may pay bills utilizing the telephone, a computer terminal, or other electronic, data transmission means. Transactions are recorded against the consumer's account wherever he or she banks. The consumer may be an individual or a business, large or small. The present invention works regardless of where the consumer banks.

In accordance with the present invention, an integrated electronic billing and payment system initiates payments of electronically presented bills by using selective debiting of the appropriate deposit account to reduce the risk to the service provider. Payments may be initiated by directing that a check or draft be printed, and/or by directing an electronic fund transfer.

The system includes a memory configured to store bill information representing a plurality of bills of a plurality of billers for a plurality of payors. The stored bill information might include information representing a first of the plurality of bills of a first of the plurality of billers for a first of the plurality of payors.

The memory may be any type of storage device and could, for example, take the form of a hard, floppy or compact disk, optical disk, random access memory (RAM), or some other form. The bill information, may represent a detailed bill, or a summary bill, which normally includes only a summary of the information from a detailed bill. Billers may be merchants or other types of billers, including non-merchant billers.

The system also includes a processor. The processor may include a single or multiple processing device, such as processing devices included in one or more mainframe computers. The processor is configured, e.g. programmed, to direct transmission of the bill information to the plurality of payors. It should be understood, that the bill information representing the bills of the billers for a particular payor, are only transmitted to that payor, and not to other of the payors. The transmitted bill information is received and a represented bill can be presented to that the applicable payor.

Turning now to payment, the processor may, for example, receive a first payment instruction from the first payor to pay the first bill based on the transmitted information representing the first bill. The processor is further configured to determine the risk, e.g. a credit risk, associated with payment of the first bill and to select a debit type based upon the determined risk. The risk determination can be made based on various factors, a number of which are described in detail below. The processor initiate payment of the first bill to the first biller is based on the received payment instruction and the selected debit type.

According to an aspect of the invention, the processor is further configured to select the debit type from a group of different debit types. For example, this group may include debiting a deposit account associated with the first payor and debiting a deposit account associated with a service provider.

If the selected debit type is the debiting of the deposit account associated with the first payor, the processor is advantageously further configured to initiate the payment using any one of a number of different alternatives. For example, the processor may initiate the payment by either (i) directing an ACH crediting to a deposit account associated with the first biller of ACH debited funds from the deposit account associated with the first payor, or (ii) directing preparation of a negotiable instrument payable to the first biller drawn on the deposit account associated with the first payor.

On the other hand, if the selected debit type is the debiting of the deposit account associated with the service provider, the processor may initiate the payment using other alternatives. For example, the processor may function to initiate the payment by either (i) directing ACH crediting to the deposit account associated with the first biller of ACH debited funds from the deposit account associated with the service provider, (ii) directing another type of crediting, such as RPS crediting, to the deposit account associated with the first biller of ACH debited funds from the deposit account associated with the service provider, or (iii) directing preparation of a negotiable instrument payable to the first biller drawn on the deposit account associated with the service provider.

If the selected debit type is the debiting of the deposit account associated with a service provider, the service provider will typically need to be reimbursed. Accordingly, the processor is beneficially further configured to direct an ACH crediting to the deposit account associated with the service provider of other ACH debited funds from the deposit account associated with the first payor.

According to other aspects of the invention, the memory may be further configured to store a single payment amount threshold associated with all of the plurality of payors. Such a threshold might be appropriate when, for example, all the payors are associated with a single bank or other financial institute. The received payment instruction will typically include an associated payment amount. The processor can be further configured to determine the risk based on the relationship between the payment amount associated with the received payment instruction and the stored single payment amount threshold.

The memory might also or alternatively be further configured to store a respective payment amount threshold associated with each of the plurality of payors and/or each of the plurality of billers. If so, the processor can be further configured to determine the risk based on the relationship between the payment amount associated with the received payment instruction and the stored payment amount threshold associated with the first payor or the first biller, or both.

Furthermore, the memory may also or alternatively be further configured to store yet another different payment amount threshold. For example, the received payment instruction may not only include an associated payment amount, but may also include an associated time for payment which is within some time period, e.g. a calendar month. The processor may, if desired, be further configured to compute a sum of the payment amount associated with the received payment instruction and other payment amounts associated with other received payment instructions for other payments within the time period. The processor can then determine the risk based on a relationship between the computed sum and the stored payment amount threshold.

As noted above, the thresholds may be applied individually or in any combination. Additionally, different thresholds or combinations of thresholds may be applied to different payors or groups of payors.

In a practical implementation, an integrated billing and payment network includes a communications network, such as the Internet and/or the public switch telecommunications network. Also included are a service provider station, which will sometimes be referred to as a first station and could, for example, incorporate the system described above. Additionally, multiple payor stations are included, one of which will sometimes be referred to as a second station. The payor stations might take the form of a personal computer (PC) or some other type network device.

The first station transmits bill information representing a plurality of bills of a plurality of billers for a plurality of payors. The bill information is transmitted to the payors via the communications network. The transmitted bill information might include first information representing a first of the plurality of bills of a first of the plurality of billers for a first of the plurality of payors.

A second station, associated with the first payor, receives the transmitted first information via the communications network. The station then presents the represented first bill to the first payor based on the received first information. The station is operable to transmit a first payment instruction, to pay the presented first bill, via the communications network.

The first station receives the first payment instruction via the communications network. The station determines a risk associated with payment of the first bill, and selects a debit type based on the determined risk. The station then initiates payment of the first bill to the first biller based on the received payment instruction and the selected debit type.

Preferably, the first station selects the debiting of a deposit account associated with either the first payor or the service provider. If the debiting of the deposit account associated with the first payor is selected, the first station may initiate the payment in various different ways. For example, the station may initiate the payment by either (i) directing an ACH crediting to a deposit account associated with the first biller of ACH debited funds from the deposit account associated with the first payor, or (ii) directing preparation of a negotiable instrument payable to the first biller drawn on the deposit account associated with the first payor.

However, if the debiting of the deposit account associated with the service provider is selected, the first station may direct the payment in other ways. In such a case, the payment may be initiated by (i) directing an ACH crediting to the deposit account associated with the first biller of ACH debited funds from the deposit account associated with the service provider, (ii) directing another type of crediting, such as RPS crediting, to the deposit account associated with the first biller of ACH debited funds from the deposit account associated with the service provider, or (iii) directing preparation of a negotiable instrument payable to the first biller drawn on the deposit account associated with the service provider. If the debiting of the deposit account associated with a service provider is selected, the service provider must be reimbursed for the payment. To reimburse the service provider for the funds debited from its deposit account, the first station will also typically direct an ACH crediting to the deposit account associated with the service provider of other ACH debited funds from the deposit account associated with the first payor.

The received payment instruction will usually have an associated payment amount. In accordance with other aspects of the invention, the first station may determine the risk based on a relationship between the payment amount and a payment amount threshold.

The received payment instruction will also typically have an associated time for payment. The associated time will be within a time period, e.g. a calendar month. According to still other aspects of the invention, the first station may be further configured to compute a sum of the payment amount associated with the received payment instruction and other payment amounts associated with other received payment instructions for other payments within the time period. If so configured, the station may determine the risk based on the relationship between the computed sum and a payment amount threshold.

BRIEF DESCRIPTION OF DRAWINGS

FIG. 4 depicts a payor enrollment screen in accordance with the present invention.

FIG. 5 depicts another payor enrollment screen in accordance with the present invention.

FIG. 6 depicts a still further payor enrollment screen in accordance with the present invention.

FIG. 9B depicts bill presentment information which includes an unpaid bill summary screen in accordance with the present invention.

FIG. 11 depicts bill presentment information which includes a detailed bill screen in accordance with the present invention.

FIG. 13 depicts bill presentment information which includes a listing of information related to bills which have been authorized for payment in accordance with the present invention.

BEST MODE FOR CARRYING OUT THE INVENTION

Overview of Selective Features

Figure 1:
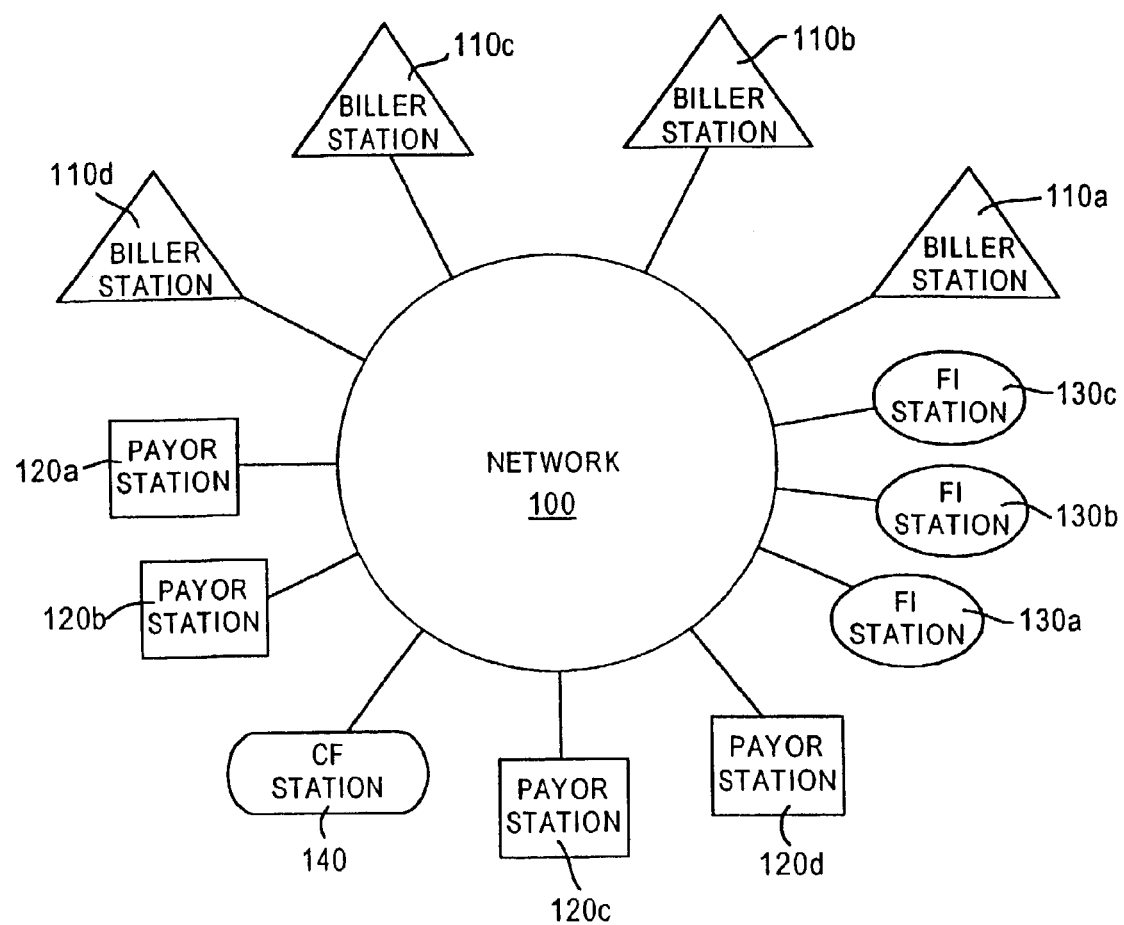
FIG. 1 depicts a bill processing network in accordance with the present invention.

In accordance with the invention, an electronic bill presentment system includes a memory, such as an electrical or optical storage device, a processor, such as a high speed microprocessor, and a communications network interface. The system may take the form of one or more servers interconnected to a private or public bill presentation network, e.g. the Internet.

The memory stores billing information, associated with various billers, representing bills for various payors. Preferably the billing information is received from the billers or their representatives, e.g. bill consolidators, via the network interface and is stored on the memory by the processor in association with an identifier of the appropriate payor.

In a typical operational sequence, the processor accesses the memory to read the stored billing information. Using this information, the processor generates bill presentment information which corresponds to a portion of the billing information which represents bills for a first payor. The processor also generates bill presentment information which corresponds to other portions of the billing information which represents bills for other payors. The bill presentment information may relate to paid bills, unpaid bills or bills having another desired status, or any combination thereof. The bill presentment information, may be a detailed bill which includes all the applicable billing information, could be a summary of the applicable billing information, or could be a simple retransmission of all or some of the applicable billing information. Some or all of the bill presentment information may also be stored in the memory.

Preferably, the bill presentment information includes a summary listing of all bills of a desired status, such as all paid or unpaid bills. Beneficially, the bill presentment information includes a listing of respective billed amounts owed by the payor to a number of the different billers, which can be presented as one or more pages on a display, such as the monitor of a payor's home or office computer. The bill presentation information could also include a formatted version of all the applicable billing information, such as a full detailed presentation of a bill, which can be presented on a display so as to appear substantially similar to the conventional hardcopy bills which are regularly received by mail today.

The processor generates signals directing transmission of the applicable bill presentment information responsive to requests for current billing information, received by the network interface, from respective payors. The network interface transmits the applicable bill presentment information to the appropriate payor responsive to the applicable signal.

Preferably, the processor generates a notice of availability of current billing information to each of the payors for whom billing information has been received by the system and stored in the memory. In this regard, the processor generates a signal directing the transmission of each notice, responsive to which the network interface transmits a respective notice to the appropriate payor. Each notice may be an e-mail message addressed to the network e-mail address, e.g. an Internet e-mail address, of the appropriate payor.

According to other aspects of the invention, the processor may also generate a further notice of availability of current billing information and a signal directing the transmission of this further notice to a payor after some period of time has passed subsequent to the applicable billing information having been first noticed to or requested by the payor. For example a further notice may be generated if no request for bill presentment information is received for some period of time after a first notice of availability has been transmitted. An additional notice may also or alternatively be generated if no notice of payment of some or all of the bills represented the applicable portion of the billing information has been received by the system for some period of time after bill presentment information has been requested by a payor, transmitted to a payor or viewed by a payor. The network interface transmits this further notice to the applicable payor responsive to the signal.

According to further aspects of the invention, the processor may continuously update the bill presentation information based upon the new bill related information, such as additionally received billing information representing new bills to be paid or the payment of bills which were represented by billing information previously received by the applicable payor. In this regard, the processor, if desired, can generate new bill presentment information corresponding to some or all of the portion of the old billing information which represents bills for a particular payor, e.g. that which represents only those bills which have been paid or remain unpaid, and the portion of the new billing information which represents bills for the same payor, e.g. newly paid bills or new outstanding bills. If, for example all the bills represented by the applicable portion of the old billing information have been paid, the new bill presentment information would only include the applicable portion of the new billing information. This new billing information may be associated with the same and/or different billers as the previously received billing information, but would more typically relate to different billers. The processor also generates a signal directing the transmission, via the network interface, of the new bill presentment information to the applicable payor responsive to the payor's request for the then current billing information.

In accordance with a further embodiment of the invention, an electronic bill presentment network is provided. The electronic bill presentment network includes a private or public communications network, such as the Internet, interconnecting multiple biller stations, multiple client stations and a network server.

The biller stations each transmit the billing information associated with a respective one of the different billers to the server via the network. The network server receives and stores the transmitted billing information. The received information is stored such that the portion of the billing information representing bills for a particular payor is associated with that payor. Using a client station a payor can transmit, via the network, a request for current billing information. The network server receives each payor request and transmits bill presentment information, which corresponds to an appropriate portion of the billing information, to the applicable payor client station via the network responsive to the request.

As discussed above, if desired, the network server can transmit a notice of availability of current billing information to payors via the network. The client stations may transmit, subsequent to the transmission of a first request for current billing information, one or more additional request for then current billing information via the network. Hence, applicable current bill presentation information will be provided on-demand to the payor.

Beneficially, the network server receives notification of the payment of bills represented by the respective portion of the billing information applicable to each payor. In such a case, the network server only transmits or retransmits that part of the applicable bill presentment information which corresponds to the portion of the billing information representing the remaining unpaid bills via the network responsive to a payor request for information regarding outstanding bills which is received by the network server after receipt of the notice of payment.

Payment processing includes, for example: gathering payor information and creating a master file with banking or other financial institution information and routing codes; inputting payment instructions by the payor at a convenient location (e.g., at home), typically remote from the payment service provider, by using an input terminal; applying the payment instructions to the payor's file; using computer software to examine various files to determine such things as what is the appropriate form of payment based on variables involving banking or other financial institutions and merchants or other payees; comparing each transaction against a dynamic credit file and routing based on set parameters; and, if the system determines that everything is ready for payment to be made, adjusting the payor's account (usually by debiting) and making payment directly to the billing entity or other payee. The single source service provider for payee payment could be any entity with the capability to practice the invention as described hereinafter. The foregoing and other objects and advantages will become more apparent when viewed in light of the accompanying drawings and following detailed description.

DETAILED DESCRIPTION

Network infrastructure

FIG. 1 depicts a communications network 100, which can be a private or public network such as a wide area network (WAN), the Internet or some other type of communication network for linking biller stations 110a-110d, payor stations 120a-120d, financial institution (FI) stations 130a-130c and a centralized CF station 140. The biller stations 110a-110d may represent individual merchants, utility companies, service providers, bank credit card companies, or other individuals or entities to whom a payment is owed. Payor stations 120a-120d may represent individuals or entities which have purchased or ordered goods or services or otherwise have an outstanding debt to the billers represented by stations 110a-110d. The payors represented by stations 120a-120d maintain accounts with one or more of the financial institutions, which may, for example, be banks, credit unions or other type of financial institution or any combination. Each of the billers represented by stations 110a-110d may also maintain one or more deposit accounts in the financial institutions represented by stations 130a-130c. The CF station 140 serves as a centralized bill processing system as will be described in detail below.

Figure 2:
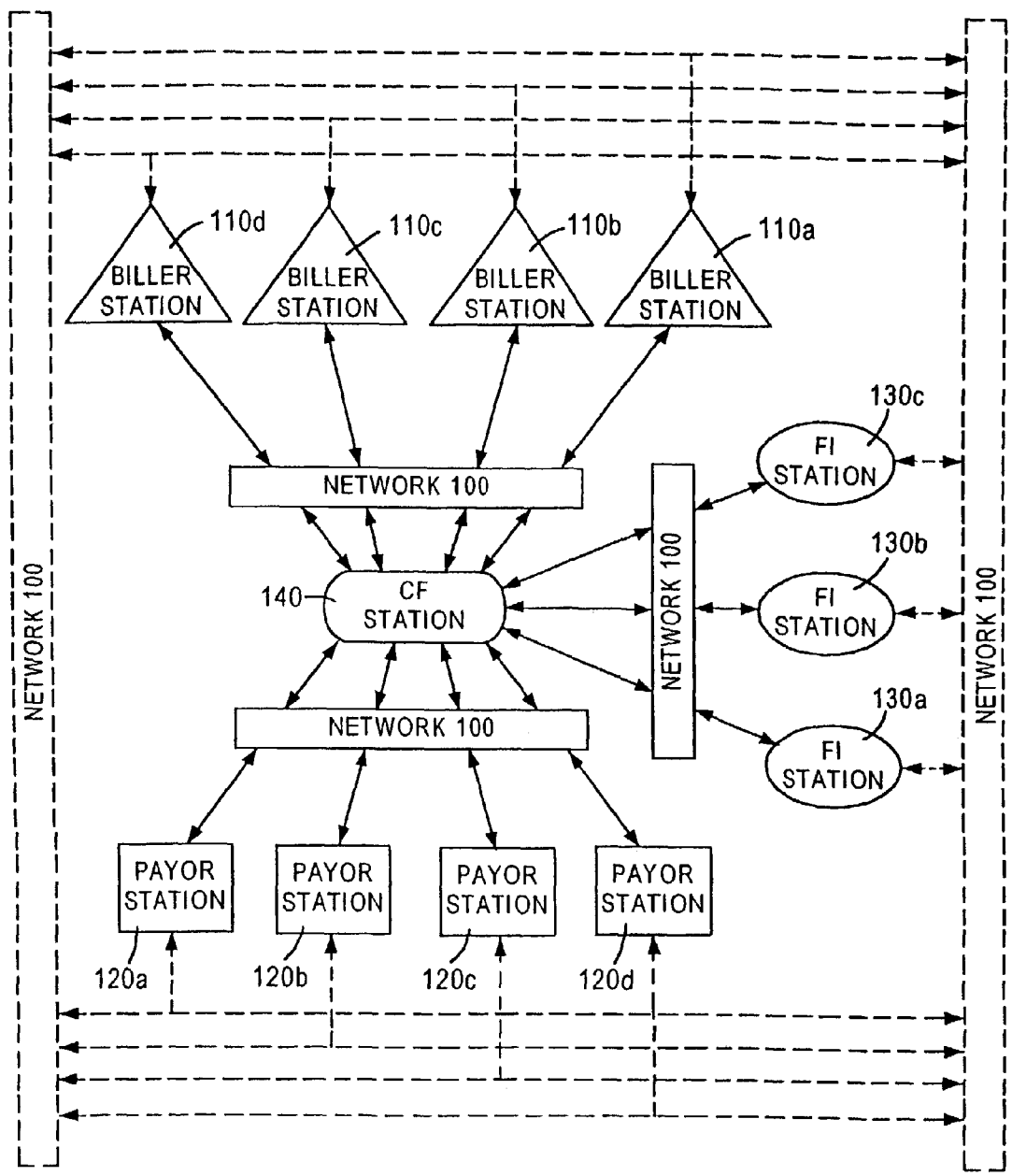
FIG. 2 depicts a functional block diagram of the bill processing network of FIG. 1.

FIG. 2 is a functional block diagram of the bill processing network depicted in FIG. 1. As shown in FIG. 2, the CF station 140 is interconnected, via the network 100, with each of the biller stations 110a-110d and each of the payor stations 120a-120d. Accordingly, each of the billers represented by stations 110a-110d can transmit, via the network 100, billing information to each of the payors represented by stations 120a-120d as appropriate through the CF station 140.

Electronic Bill Presentment

Figure 2A:
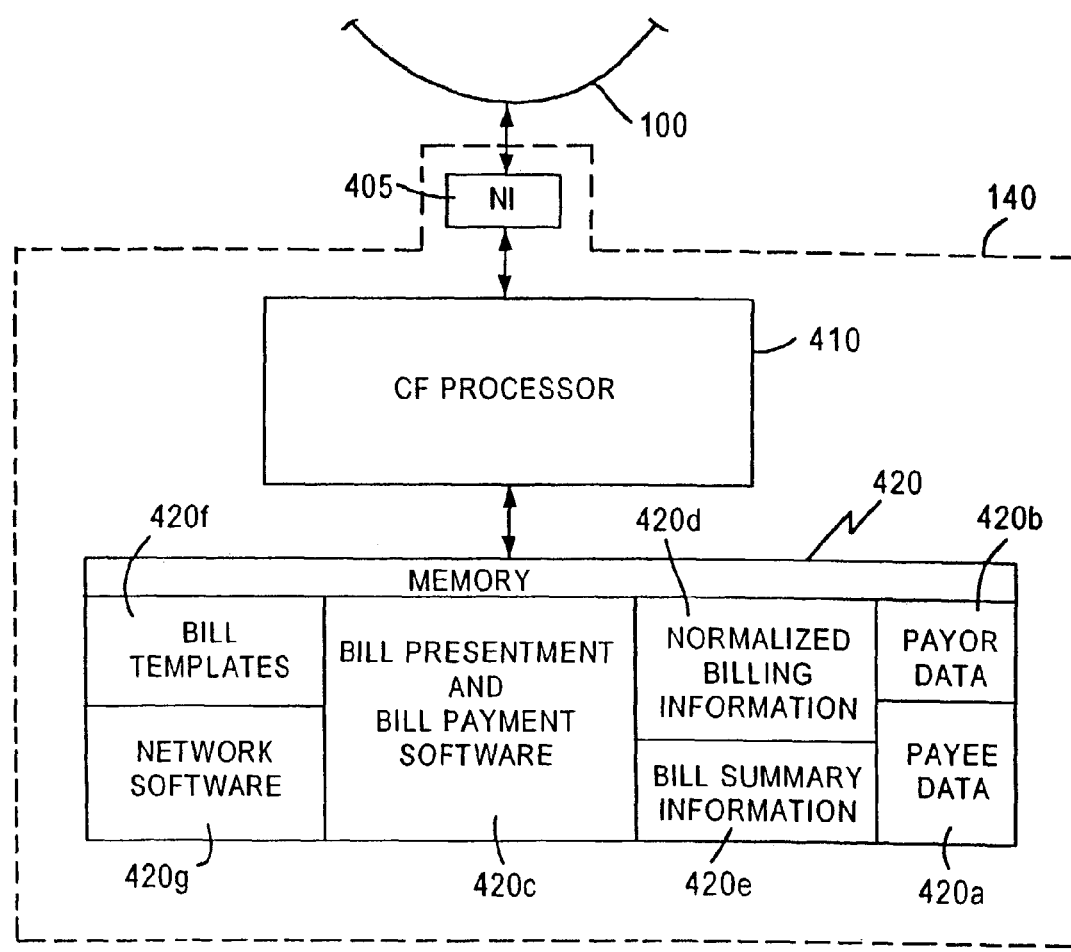
FIG. 2A depicts a simplified block diagram of the CF station of FIG. 1.

As shown in FIG. 2A, the CF station 140 includes a network interface (NI) 405 for receiving and transmitting communications via the network 100. The station 140 also includes a processor 410 and a memory 420. The station 140 could, for example, be a high powered work station, minicomputer, mainframe computer or other type of network computing device which serves as a network server, or any combination of such devices. The memory 420 stores, in area 420a, which will sometimes be referred to as a merchant master file database and is described further below with reference to FIG. 17, biller data such as the biller's name, remittance center address, deposit account number with one of the financial institutions represented by stations 130a-130c, account numbers for respective payors represented by stations 120a-120d, network address, e.g. an e-mail address, and other biller related information of each of the billers represented by stations 110a-110d. Payor data is stored in memory area 420b, which is sometimes referred to as the consumer database and described further below with reference to FIG. 16, and will typically include such information as the payor's name and address, account numbers with respective billers represented by stations 110a-110d, checking account number with one of the financial institutions 130a-130c, network address, e.g. an e-mail address, and other payor related information.

The billing information received by the CF station 140 from the respective billers represented by stations 110a-110d via the network 100 is normalized by the server processor 410 in accordance with the bill presentment software stored in memory area 420c. Different portions of the normalized bill information are stored in memory area 420d in association with a respective identifier of the appropriate payor represented by station 120a-120d to whom that portion of the billing information relates.

The bill presentment software also generates a summary of the received billing information from each of the billers represented by stations 110a-110d for each of the payors represented by stations 120a-120d and stores the summary information with an identifier of the applicable payor in the memory area 420e. Bill templates are stored in memory area 420f. The bill templates can be merged with the normalized billing information to electronically present the billing information to the appropriate payor represented by station 120a-120d in substantially the same form, including detailed billing information, biller logo, color and terms and conditions, as has historically been provided to the payor in hardcopy. Network software is stored in area 420g of the memory 420.

Once the billing information has been processed by the processor 410 so as to be available for access by the appropriate payors, the processor 410 in accordance with the bill presentment software instructions stored in memory area 420c, generates an e-mail or other message to notify the applicable payors represented by station 120a-120d of the availability of bill presentment information. The processor 410 also generates a signal directing the transmission of the message, via the network interface 405, to the applicable payors using a network address, e.g. an e-mail address, stored as part of the payor data in area 420a of the memory 420.

Figure 3:
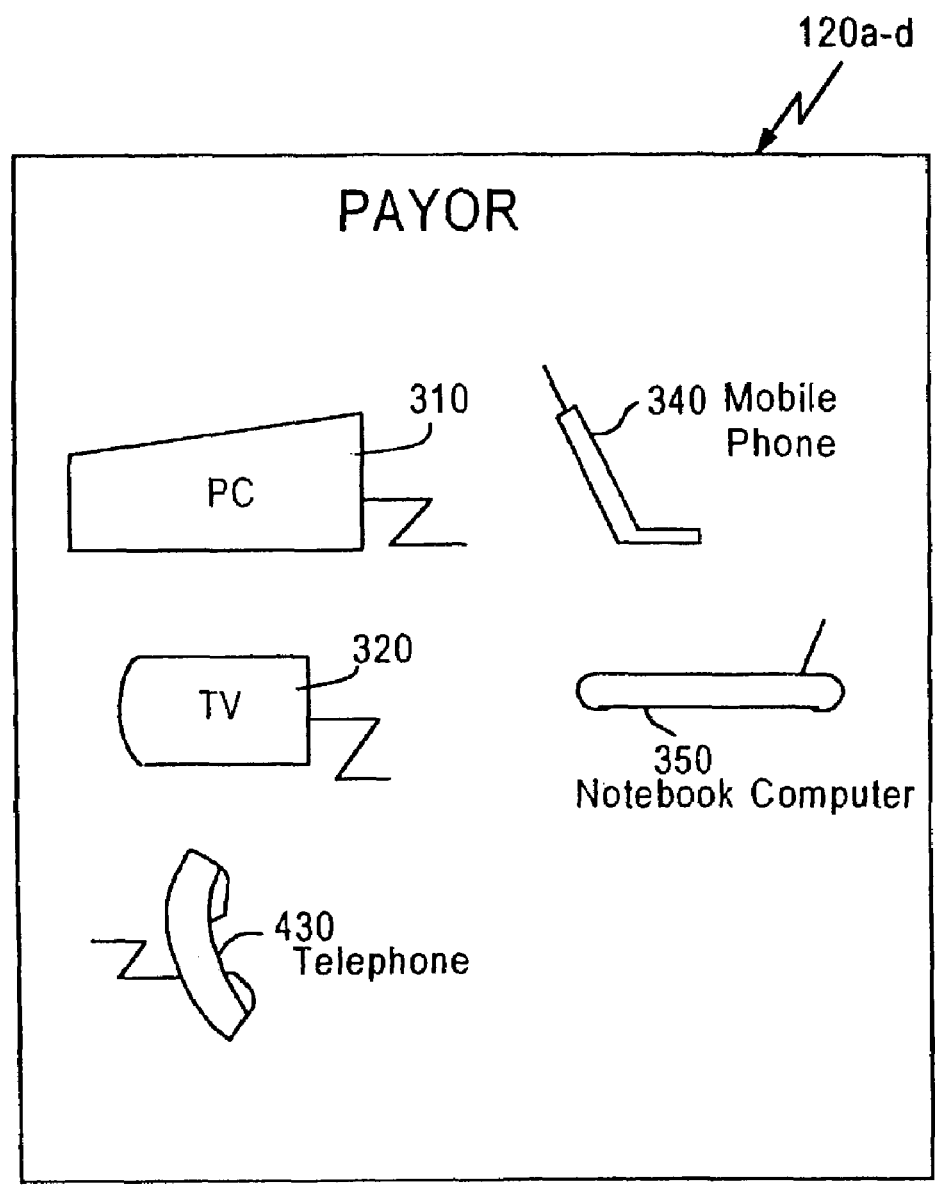
FIG. 3 depicts various types of payor stations which can be utilized in the bill processing network of FIG. 1.

As shown in FIG. 3, the payor 120a-120d may be represented by a personal computer (PC) 310 interconnected to the network 100 by a modem, a television (TV) 320 interconnected to the network 100 via a set top box, a touch tone telephone 430, a mobile phone 340, a notebook computer 350 interconnected to the network 100 by a modem, or some other network device. It will recognized by those skilled in the art that the network device could be of virtually any type capable of receiving a voice, graphic, or textual message. If different types of payor station devices are utilized, the payor data will include an identification of the particular type of network device being utilized by the payor. If audio devices such as telephone 430 or mobile phone 340 are utilized, the processor 410 is configured to include a voice synthesizer to generate voice messages and a voice signal converter to transform received audio messages into digital signals of processing at station 140 in accordance with the bill presentment software instruction stored in memory area 420c.

Figure 2B:
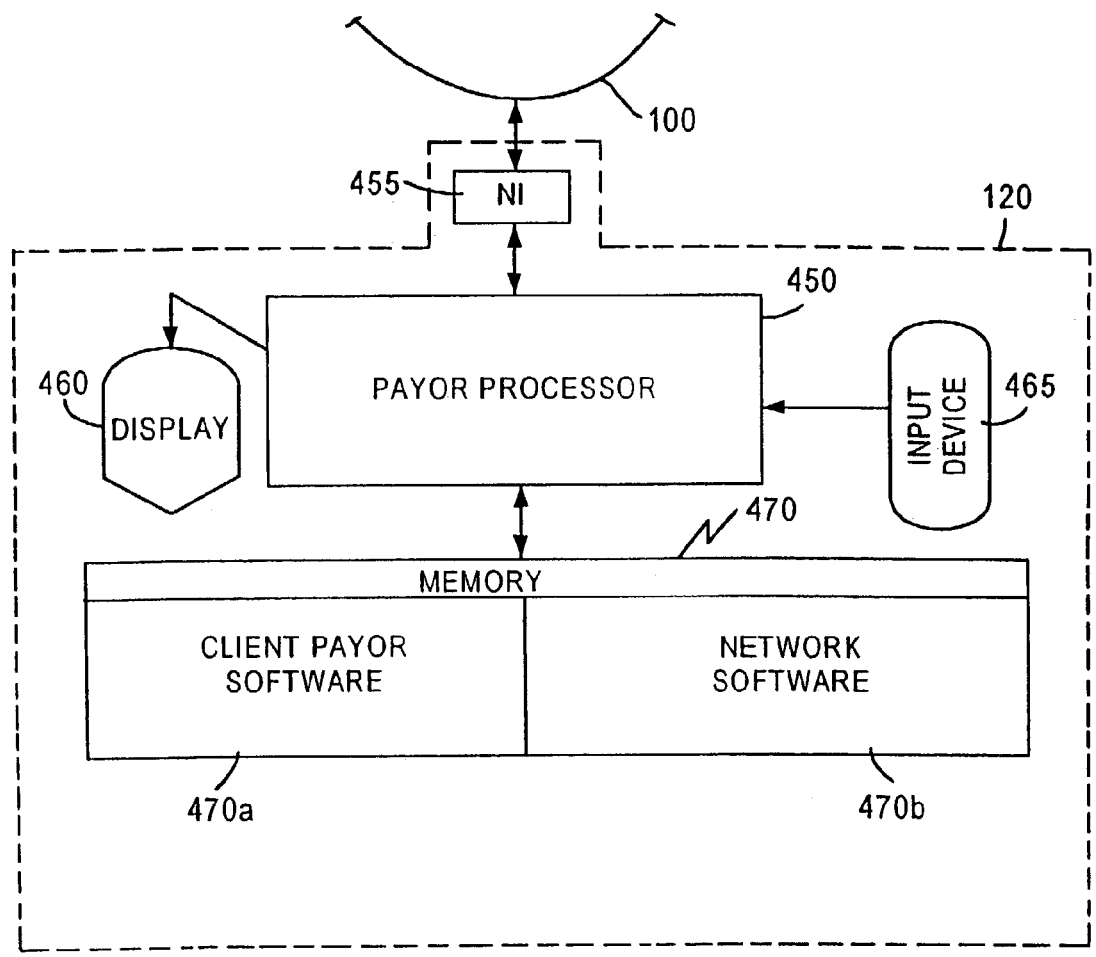
FIG. 2B depicts a simplified block diagram of an exemplary payor station of FIG. 1.

Referring now to FIG. 2B, an exemplary payor station 120 capable of receiving e-mail messages will now be described. Station 120 includes a payor processor 450 which is interconnected to a memory device 470. The memory stores the payor client software in area 470a and the network software in area 470b of the memory 470. It will however be recognized that, if desired, the memory 470 could be eliminated in and that storage of the payor client software could be implemented on the memory 420 of the CF station 140. A network interface (NI) 455 interconnects the payor station 120 to the network 100. Messages transmitted by the CF station 140 to the payor station 120 are received via the network interface 455 and processed by the processor 450 in accordance with the network software stored in area 470b of memory 470.

In a customary e-mail notification processing sequence, the processor 450, in accordance with the network software instructions stored in memory area 470b, directs the presentation of an indicator on the display 460 of the payor station 120 to notify the applicable payor that an e-mail message has been received. Using the input device 465, which may be a keyboard, mouse or other input device, the applicable payor can access the e-mail message and request the available billing related information from the CF station 140.

The notification mechanism may alternatively be implemented directly in the bill presentment client rather than via e-mail. Those of ordinary skill in the art will recognize that there may be many possible implementations of a notification mechanism.

The payor may request the available billing related information by, for example, inputting one or more commands on the input device 465. Responsive to these commands, the processor 450 generates and directs the transmission of the request, via the network interface 455, to the CF station 140. The generated request could, for example, take the form of a reply e-mail message, an instruction to access a web page at the CF station 140 if the network is the Internet or some other instruction as will be well understood by those skilled in the art. If desired, the e-mail message could include an icon or other indicator which can be activated using the input device 465 to automatically link the payor station 120 to the CF station 140 to access bill related information.

Referring again to FIGS. 2 and 2A, the processor 410 of the CF station 140, in response to the request received from the payor station 120a-120d, directs the transmission of the requested bill presentment information, via the network interface 405, to the applicable payor station 120a-120d. The transmitted bill presentment information may need to be generated by the processor 410 responsive to the payor request or may be already stored in the memory 420. For example, the processor 410 may either retrieve the applicable template(s) and normalized billing information from memory areas 420f and 420d and merge this information to generate requested detailed bill presentment information. On the other hand, the processor may simply retrieve information stored in area 420e of memory 420 if only bill summary information is requested. It should be noted that by storing unmerged templates and normalized data and merging this information only responsive to request for detailed information, the required memory to store detailed bill presentment information can be significantly reduced. It should be understood that, in many cases, the payor will require only summary bill presentment information, and thus on-line processing to merge the templates and normalized billing information will not, in many cases, be required. However, preferably, detailed bill presentment information dynamically generated by merging template and normalized data may be cached to support re-retrieval requests responsively.

Referring again to FIG. 2B, the payor station 120a-120d receives, via network interface 455 of payor station 120, the bill presentment information transmitted by the CF station 140 over the network 100. The payor processor 450 processes the received information in accordance with the payor client software stored in memory area 470a and directs the presentation of the received bill presentment information on the display 460 of the payor station 120.

General Payment Processing

Although payment processing will be described in further detail with reference to FIGS. 16-21, the following provides an overview of certain aspects of the processing relating to the payment of presented bills.

As discussed above referring to FIG. 2, the CF station 140 is linked via the network 100 to various financial institution stations 130a-130c which represent financial institutions with whom checking accounts are maintained by one or more of the payors represented by stations 120a-120d and/or deposit accounts are maintained by one of more of the billers represented by stations 110a-110d. A payor, having received bill presentment information, can now request that payment of one or more bills be made to the appropriate biller(s) represented by station(s) 110a-110d.

In this regard referring again to FIG. 2B, the payor processor 450 generates, in accordance with the client software residing in memory area 470a, a payment instruction and an instruction directing the transmission of the instruction, via the network interface 455, over the network 100 to the CF station 140. Referring again to FIG. 2A, the payment instruction is received and processed by the processor 410 of CF station 140. The processor 410, responsive to the received payment instruction and in accordance with the bill payment software stored in memory area 420c, directs the payment of the applicable bills either by electronic funds transfer or by hardcopy check.

If the payment will be made by electronic funds transfer, the CF processor 410 generates an electronic funds transfer instruction to electronically transfer the appropriate amount from the applicable payor's checking account maintained at one of the financial institutions represented by stations 130a-130c to the appropriate biller's deposit account maintained at one of the financial institutions represented by stations 130a-130c. The processor 410 also generates an instruction to transmit the electronic funds transfer instruction via the network interface 405, over the network 100 to the applicable payor financial institution station 130a-130c and/or an originating financial institution and or originating financial institution to the Automated Clearing House (ACH) network or similar financial network for funds transfer.

The processor 410 also generates, in accordance with the bill payment software instructions stored in memory area 420c, a message indicating the amount of payment remitted and the associated payor account number, along with an instruction to transmit the message, via the network interface 405, over the network 100 to the appropriate biller station 110a-110d. This remittance advice information may flow directly to the biller station 110a-110d or be routed with the payment through the biller's financial institution 130a-130c, which would deliver the information to the biller station. It should be recognized that the biller station to which the payment notice is transmitted may be different than the biller station from which the billing information is transmitted.

If the payment will be made by hardcopy check, the CF processor 410 generates an instruction to print a hardcopy check for the appropriate amount against funds in CF station 140's checking account. The applicable payor's checking account maintained atone of the financial institutions represented by stations 130a-130c is debited appropriately via ACH (resulting in electronic funds transfer to the CF station account) or via some form of "good funds" debiting through a direct electronic connection to the financial institution (resulting in electronic or wire funds transfer to the CF station account). The check may be a "single check" remitting only a single payor's payment to a particular biller, or a "check and list", combining the remittance from multiple payors to a particular biller. Alternatively, the CF processor may generate an instruction to print a hardcopy check, sometimes referred to as a draft, for the appropriate amount against funds in the applicable payor's checking account maintained at one of the financial institutions represented by stations 130a-130c.

The processor 410 also generates, in accordance with the bill payment software instructions stored in memory area 420c, a message indicating the amount of the payment(s) remitted and the associated payor account(s). The printed message, i.e. the remittance advice, and check are then mailed to the applicable biller remittance center. It should be recognized that the location to which the payment notice is sent may be different than the location of the biller station from which the billing information is transmitted.

Distributed Functionality

Referring again to FIG. 2, rather than having all operations performed by the CF station 140, certain operations can be performed directly by other network stations and certain information can be transmitted directly between the payor stations 120a-120d, the biller stations 110a-110d and the financial institution stations 130a-130c. It may, in some instances, be preferred to have the CF station 140 linked to the payor stations 120a-120d and biller stations 110a-110d via the financial institution stations 130a-130c.

For example, it may be desirable in some cases for the biller stations 110a-110d to communicate some or all bill related information via the network 100 directly to the payor stations 120a-120d while the notices of the availability are generated and transmitted by the CF station 140 directly to the appropriate payor stations. This facilitates biller control over bill related information which could be stored exclusively on a memory device at the appropriate biller station. In other cases, it may be advantageous for all payment instructions to be transmitted directly from the payor stations 120a-120d to an appropriate financial institution station 130a-130c. In such cases, there could be a preference to have the payment instruction processed by the CF station 140 or at the financial institution station 130a-130c. In still other cases, it may be beneficial for all communications to be transmitted through the financial institution station 130a-130c but all processing to be performed by the CF station 140.

As indicated above, if desired, all or part of the billing information may be retained at the biller stations 110a-110d. For example, it may be desired that detailed bill presentment information be retained at the biller stations 110a-110d while summary bill presentment information be stored and provided by the CF station 140. Although billing information may be maintained by the biller stations 110a-110d, the request for such information may be directed through the CF station 140 to the appropriate biller 110a-110d in order to provide a third party audit trail or meet other desired objectives.

Notifications of Bill Availability

Referring again to FIGS. 2 and 2A, the CF processor 410, in accordance with the bill presentment software stored in area 420c of the memory 420, preferably tracks and stores information relating to requests or transmissions of bill presentment information to payors after the notice of availability. The CF processor 410 also preferably receives, stores and tracks a signal from the payor stations 120a-120d relating to when a notice of availability bills has been viewed by the applicable payor. In this way, the processor 410, in accordance with the bill presentation software instructions, may transmit a reminder notice of the availability of bills, for example, if no request to view the bills has been received for some period of time after the payor has viewed the notice or if bills represented in previously requested bill presentment remain due and unpaid after some period of time. It may be desirable to send reminder notifications one or more times at fixed intervals, e.g., weekly, after the initial viewing of the notice of availability or the initial request for bill presentment information. A reminder notice could alternatively or additionally be sent just prior to the bill due date as a final reminder to the payor before late payment or interest charges will accrue.

Enrollment

Turning now to FIGS. 4-6, the payor enrollment process performed by the CF processor 410, in accordance with the bill presentment and bill payment software instructions stored in memory area 420c, will be described. Upon request by an existing or potential payor represented by a payor station 120a-120d, enrollment interface information is electronically transmitted via the network 100 from the CF station 140 to the applicable station 120a-120d. The information is provided so as to be capable of processing by the payor processor 450 and presented in one or more screens on a display 460 of the payor station 120. It will of course be recognized that, although the enrollment process is described with reference to a payor station of the type shown in FIG. 2B, the process could be easily implemented with other types of payor stations.

The initial enrollment screen 550, as shown in FIG. 4, includes a listing in block 560 of billers from whom bills can be received electronically. An indicator 565 indicates those billers whose bills can be received electronically and who can also be paid electronically as previously described. The payor using the input device 465 of the payor station 120 can select any or all of the billers identified in the listing in block 560 for electronic bill presentation and/or electronic payment, if applicable. The account number for the payor's account with each selected biller is inserted in block 562 using the payor input device 465. The payor is also given the option, in block 570, of identifying other payees, including billers not included in the listing in block 560. Since all billers from whom electronic bills are available are listed in block 560, block 570 is reserved for those billers, for example, the paper boy, babysitter, lawn boy, etc., to whom the payor desires to make payments electronically through the CF station 140 based upon hardcopy bills received directly from the biller. This information will typically be used to populate a consumer database, as will be described further below with reference to FIG. 16.

FIG. 5 depicts further enrollment screen 1600 transmitted by the CF station 140 to the payor station 120a-120d during the enrollment process. This screen is also presentable on the display 460 of the payor station 120. This screen facilitates the gathering of payor data which is necessary or desirable for the processing of bills. Using the input device 465 of the payor station 120, the payor enters his/her first name, middle initial, and last name in block 510 of the screen 1600. The payor is also requested to enter his/her social security number in block 520 and mother's maiden name in block 525. The maiden name of the payor's mother is requested for subsequent verification purposes. The payor's address is also requested to be entered in block 530. In blocks 540, both home and office telephone numbers are requested.

It should be noted that although the payor's account numbers for those billers selected from the listing in block 560 of FIG. 4 are requested, in certain implementation it may be preferable to obtain the account numbers from the billers as part of the information to be forwarded to the CF station 140 by the applicable billers selected in block 560 of FIG. 4. By eliminating the need for potential payors to provide an account number, the enrollment process can be simplified somewhat from the enrollee's prospective. However, it should be noted that in most cases it will be beneficial to request that the payor enter an account number for each selected biller.

Turning now to FIG. 6, another screen 600, transmitted from the CF station 140 to the payor station 120 during the enrollment process, depicts an exemplary portion of a conventional personal check in block 610. Within this block, the areas of the check having the routing and transit number (RTN) and the account number are indicated. The RTN and account number for the applicable payor's checking account with the applicable financial institution 130a-130c are entered in block 620. Additionally, in block 630, log on information is entered in the form of a user name and password to complete the enrollment process.

All of the gathered payor information will typically be used to populate a consumer database, as will be described further below with reference to FIG. 16.

Upon enrollment, the billers from whom electronic bills have been requested and the financial institutions from whom checking account withdrawals have been authorized are notified, supplied information is verified and additional information is requested.

CF Station Operations

Figure 7:
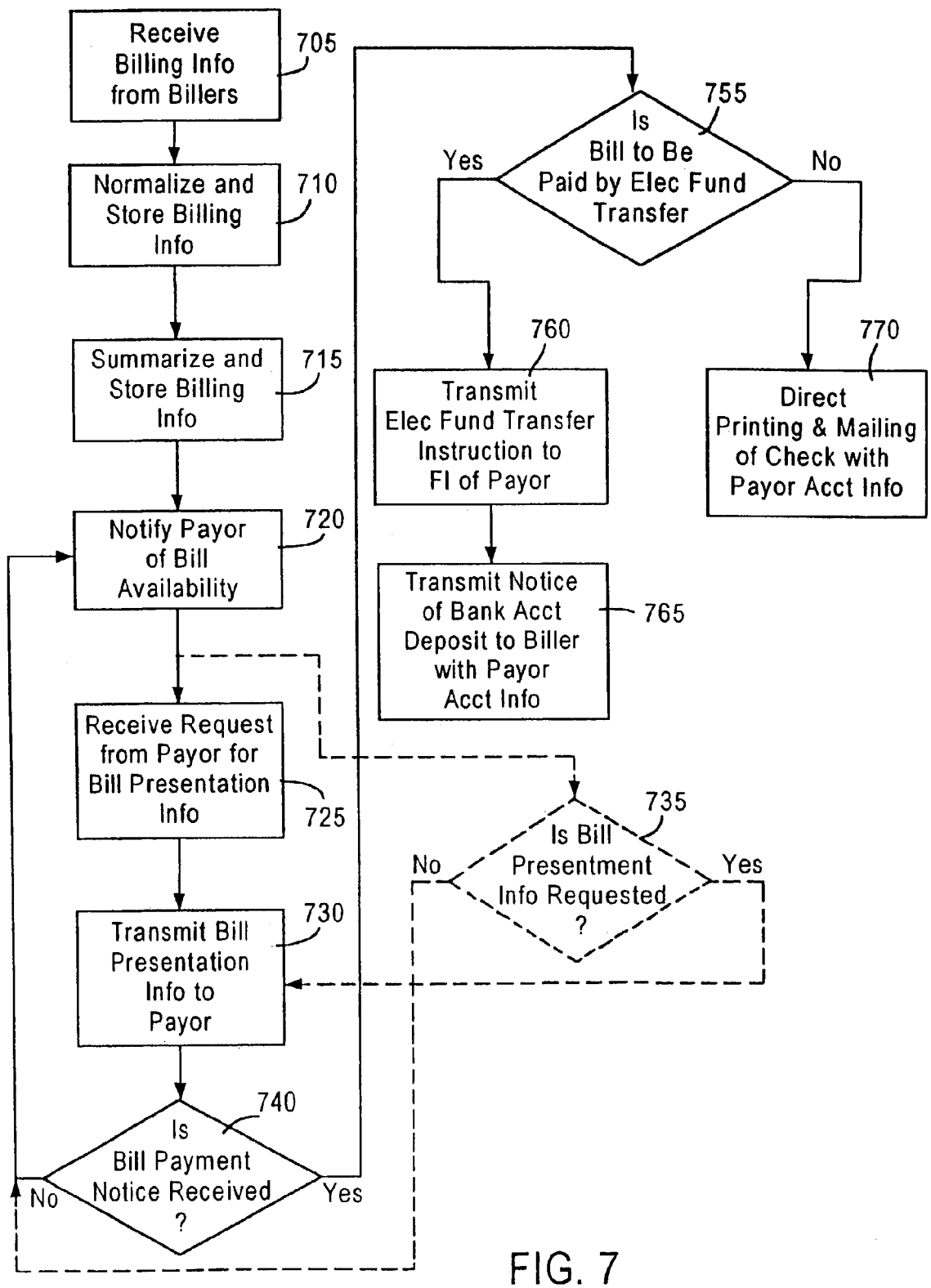
FIG. 7 depicts a simplified flow diagram of the operation of the bill processing network depicted in FIG. 1.

FIG. 7 provides a simplified flow diagram which summarizes operations of the CF station 140 during bill processing. It should be noted that the operations are described with the CF station 140 serving a centralized role within the bill processing network of FIGS. 1 and 2. Those skilled in the art will understand that the described operations could be performed, as appropriate, by stations other than the CF station 140 within the network shown in FIGS. 1 and 2, as has been previously described above.

As indicated in step 705, the CF station 140 receives billing information from the biller stations 110a-110d via the network 100. The received billing information is normalized, summarized and stored in steps 710 and 715 at the CF station 140. In step 720, the payor is notified of the availability of bills by message transmitted from the CF station 140 to the payor station 120a-120d via network 100. In step 725, the CF station 140 receives a request for bill presentation information from the applicable payor station 120a-120d. The bill presentment information is transmitted over the network 100 by the CF station 140 to the applicable payor station 120a-120d in step 730, responsive to the request. The bill presentment information may include only a summary of bills or one or more detailed bills formed by templating the normalized data before transmission. If desired the transmitted bill presentment information could include both summary and detailed bills.

In step 740, the CF station 140 determines if bill payment instructions have been received for those bills represented by the previously transmitted bill presentation information. This determination may, for example, be made at some predefined period after the receipt of a request for or transmission of the bill presentation information. If not, the payor is again notified of the bill availability in step 720.

Optionally, the payor station 120a-120d may be configured to transmit a notice to the CF station 140, responsive to the viewing of the notice of availability by the applicable payor. In step 735, the CF station 140 determines if a request to receive bill presentment information has been received for those bills represented by the previously transmitted notice of availability. This determination may, for example, be made at some predefined period after the initial viewing of the notice of availability of bill presentation information. If not, the payor is again notified of the bill availability in step 720. If a request has been received, the process continues at step 730.

As will be described in more detail below with reference to FIGS. 16 to 21, if the determinations in step 740 is positive, in step 755, the CF station 140 determines if, in accordance with the payment instruction, the bill is to be paid by electronic funds transfer. If yes, CF station 140 transmits, via the network 100, an electronic funds transfer instruction for the payor's deposit account at one of the applicable financial institution represented by stations 130a-130c in step 760. The CF station 140 also transmits, via network 100, a notice to the applicable biller station of the payment in step 765. If payment is to be made by check or draft, the CF station 140 generates a hardcopy check or draft with the appropriate account information and directs the mailing of same to the biller in step 770.

User Interfaces

Referring now to FIGS. 8-15, the payor, at his/her own prerogative, can access the bill presentment information at the CF station 140 via the network 100 at any time. For example, this contact may be initiated by using a payor station 120a-120d to contact the CF station 140 at a Web site on the Internet.

Figure 8:
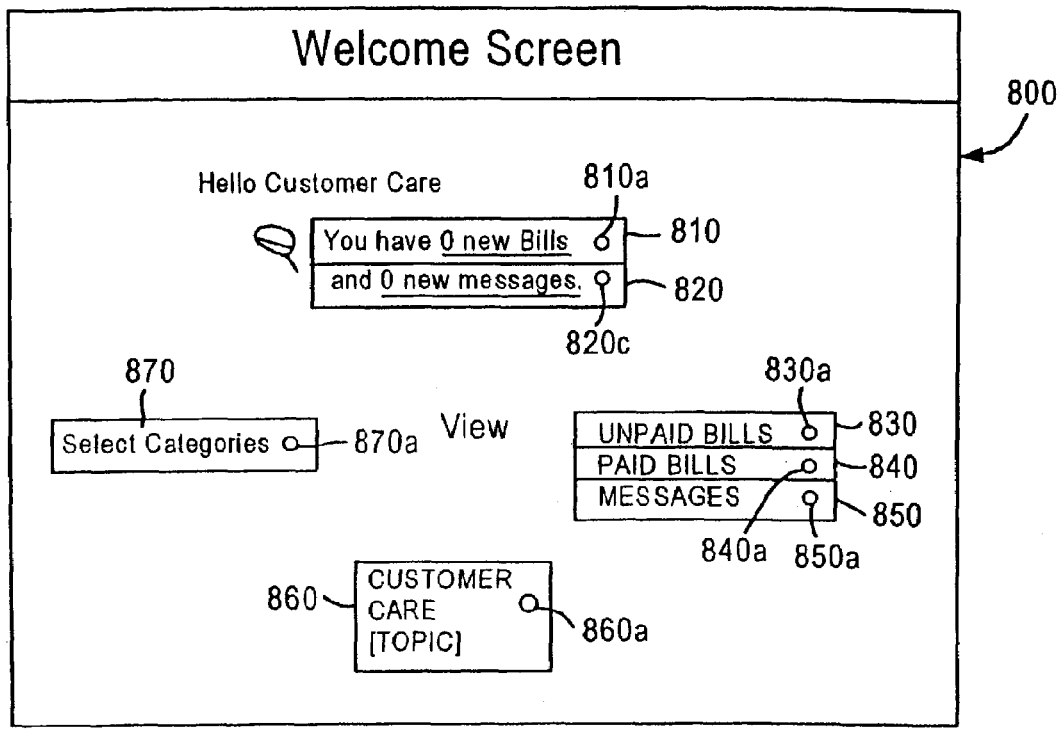
FIG. 8 depicts a payor welcome screen in accordance with the present invention.

Upon initiating contact with the CF station 140, the payor is welcomed, as shown in FIG. 8, by a screen 800 transmitted by the CF station 140 to the payor station 120a-120d for presentment on the payor station display 460. The screen 800 includes notification of bills in block 810 and of messages in block 820 which have not been previously transmitted to the payor. In this particular instance, no new bills or messages are indicated. If new bills and/or messages are available, the payor can, using the payor station input device 465, click on indicator 810c to access the new bills and indicator 820c to access the new messages.

From screen 800, the payor can also access either bill presentment information related to previously transmitted billing information, including information relating to unpaid bills or paid bills, as well as information relating to previously accessed messages by clicking on indicator 830a to receive the unpaid bills, indicator 840a to access bill presentment information related to paid bills, and indicator 850a to access other messages. The payor can also select categories as indicated in block 870 by clicking on indicator 870a. Responsive to clicking on indicator 870a, the CF station 140 will transmit a screen which will be described below and allows the payor to categorize billers in any desired manner.

The payor can also contact customer care by inserting a topic of interest in block 860 and clicking on the indicator 860a. Alternatively, block 860 may offer a pulldown list of selectable topics, similar to block 560 in FIG. 4. In such a scenario, the payor would select one of the topics prior to clicking on indicator 860a. By clicking on the indicator 860a, a message is sent from the payor station 120a-120d to the appropriate customer care station. The customer care station may be the CF station 140 for all topics, or could alternatively be the CF station 140 for certain topics, the appropriate financial institution station 130a-130c for other topics and/or the appropriate biller station 110a-110d for still other topics.

For example, if the inquiry topic relates to the accounting of certain funds transferred from the payor's checking account, the customer care request can be directed to the appropriate financial institution station 130a-130c. If the indicated topic relates to a particular merchant billing, the customer care request can be directed to the appropriate merchant station 110a-110d. If the inquiry is of a more general nature, the customer care request can be directed to the CF station 140.

The customer case messaging option shown in FIG. 8 and described here may be beneficially provided on some or all screens presented on the payor station 120a-120d.

It will be understood by those skilled in the art that, if the CF station 140 serves as a centralized gateway for all communications, all customer care requests could be directed to the CF station 140 and it may be unnecessary for the payor to indicate a topic of interest in block 860. Likewise, if all pertinent information is available at the CF station 140, then all customer care inquiries could also be directed to and disposed of by customer care represented by the CF station 140, rather than being forwarded on to a financial institution station 130a-130c or biller station 110a-110d for response.

Figure 9A:
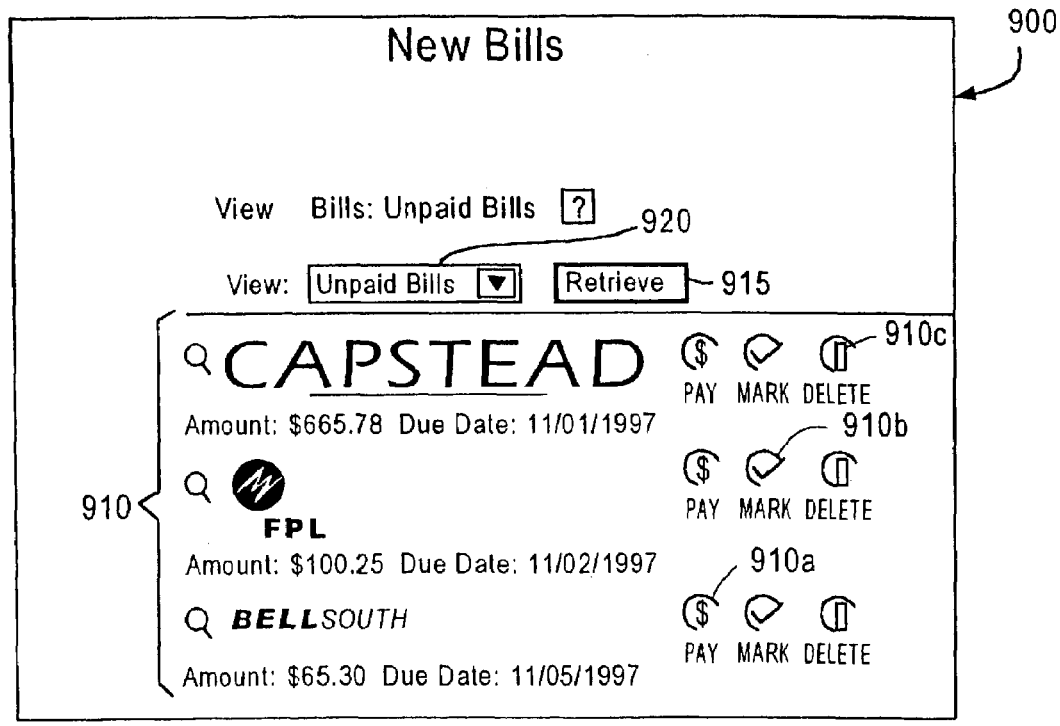
FIG. 9A depicts bill presentment information which includes a new bill summary screen in accordance with the present invention.

Referring now to FIG. 9A, as noted above, if new bills are available, a summary of As these bills can be accessed by clicking on indicator 810a. Similarly, if new messages are available, these messages can be accessed by clicking on indicator 820c. By clicking on indicator 810a when new bills are indicated, a screen 900, as shown in FIG. 9A, is transmitted from the CF station 140, via the network 100, to the payor station 120a-120d, processed by payor processor 450 and presented on the payor display 460. The screen 900 includes bill presentment information 910 which summarizes the new bills which have been received since the payor last requested bill presentment information related to unpaid bills. The summary information includes the biller name, amount of the new bill and the due date for payment of the bill.

As indicated in FIG. 9A, the applicable biller logo may be displayed as part of the presentation. The payor is given the option of clicking on a pay indicator 910a, a mark indicator 910b, or a delete indicator 910c, associated with each summarized billing. By clicking on the pay indicator 910a using the payor input device 465, a signal is transmitted to the CF station 140 to direct payment of a particular billed amount on the due date. By clicking on indicator 910c, the displayed bill presentation information relating to a particular biller is deleted. By clicking on indicator 910b, the bill summary information relating to one or more particular bills is marked and by then clicking on indicator 915 the detailed bill presentment information relating to these particular bills can be retrieved from the CF station 140.

The payor also has the option, using the payor input device 465, of clicking on block 920 to access a summary of all unpaid bills from the CF station 140. The unpaid bill summary will be substantially in the form of bill summary 910, but will include a summary listing of all unpaid bills rather than just listing new unpaid bills.

Figure 9B:
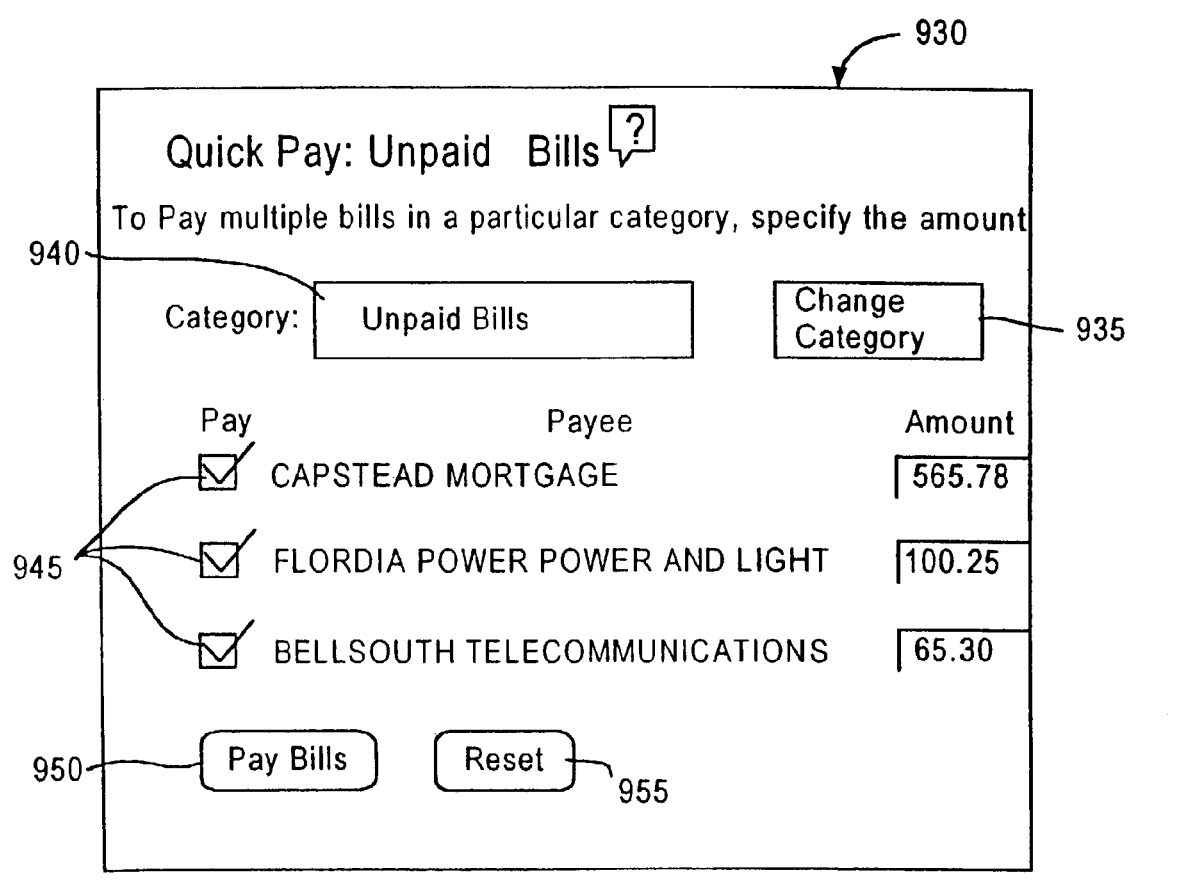

FIG. 9B depicts screen 930 which can be transmitted from the CF station 140 to present summary bill related information at the payor station 120a-12d in a categorized manner. As shown, by clicking on indicator 935, categories of billers are changed in block 940. For example, in screen 930 the category has been set to unpaid bills and accordingly, a summary of all unpaid bills appears on the payor display 460. Other categories could be, for example, utility bills, paid bills, questioned bills, credit card bills or any other category which may be desirable under the particular circumstances.

In screen 930, one or more of the check blocks 945 can be clicked on along with the pay bill indicator 950 to direct a communication from the payor station 120a-120d to the CF station 140 instructing particular bills which are summarized in screen 930 should be paid on the due date. Indicator 955 allows the check blocks 945 to be reset in the event that a block is inadvertently checked.

Figure 9C:
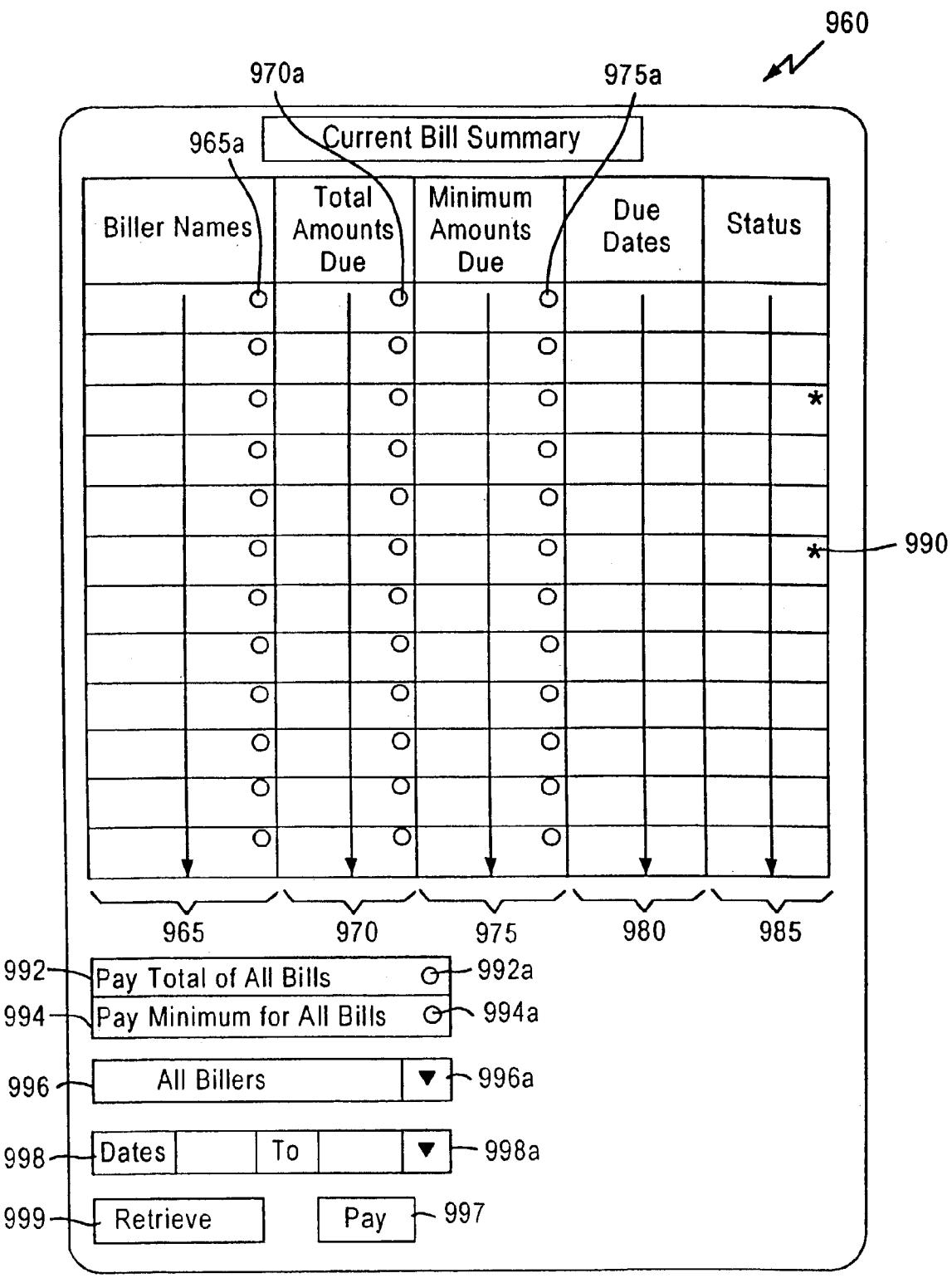
FIG. 9C depicts bill presentment information which includes another type of bill summary in accordance with the present invention.

FIG. 9C depicts still another screen 960 which can be transmitted from the CF station 140 to the appropriate payor station 120a-120d for presentation on the payor display 460. As shown, the listing contains a current bill summary with payee names 965, total bill amounts 970, minimum payment amounts due 975, payment due dates 980 and bill status 985. Indicators 990 indicate that a pre-bill payment authorization has been made with respect to particular bills. Such authorizations will be described below. The status may, for example, be indicated as unpaid, as being processed if payment has been previously directed by the payor, or as on hold if the bill has been previously questioned by the payor.

As indicated in block 992, the payor can direct that all bills summarized in the bill summary of FIG. 9C be paid by clicking on the indicator 992*a*. Clicking on indicator 992*a* will result in the payor processor 450 directing a communication to the CF station 140 to pay all of the listed bills by the due date. Alternatively, as indicated in block 994, the payor can click on the indicator 994*a* to direct payment of the minimum amount due on all listed bills be paid by the payment due date. To the extent that the payment of bills have been preauthorized by the payor, clicking on indicator 992*a* or 994*a* will not affect the preauthorized payments.

Block 996 identifies the category of billers with respect to whom bill related information is summarized in screen 960. An indicator arrow 996*a* can be clicked on to scroll through various categories of billers to change the information summarized on screen 960, as has been previously described with reference to FIG. 9B. Additionally, dates can be inserted in block 998 to limit or extend the amount of bill summary information which is displayed. The arrow indicator 998*a* can be used to change the "TO" date.

By clicking on one or more indicators 965*a* and the retrieve indicator 999, detailed bill presentment information relating to particular bill summary items can be accessed from the CF station. By clicking on one or more of the indicators 970*a* and the pay indicator 997, an instruction to pay the total billed amount associated with particular bills will be communicated to the CF station 140. By clicking on one or more of the indicators 975*a* and the pay indicator 997, an instruction will issue to the CF station 140 to make payment of the minimum amount due on particular bills.

Figure 10A:
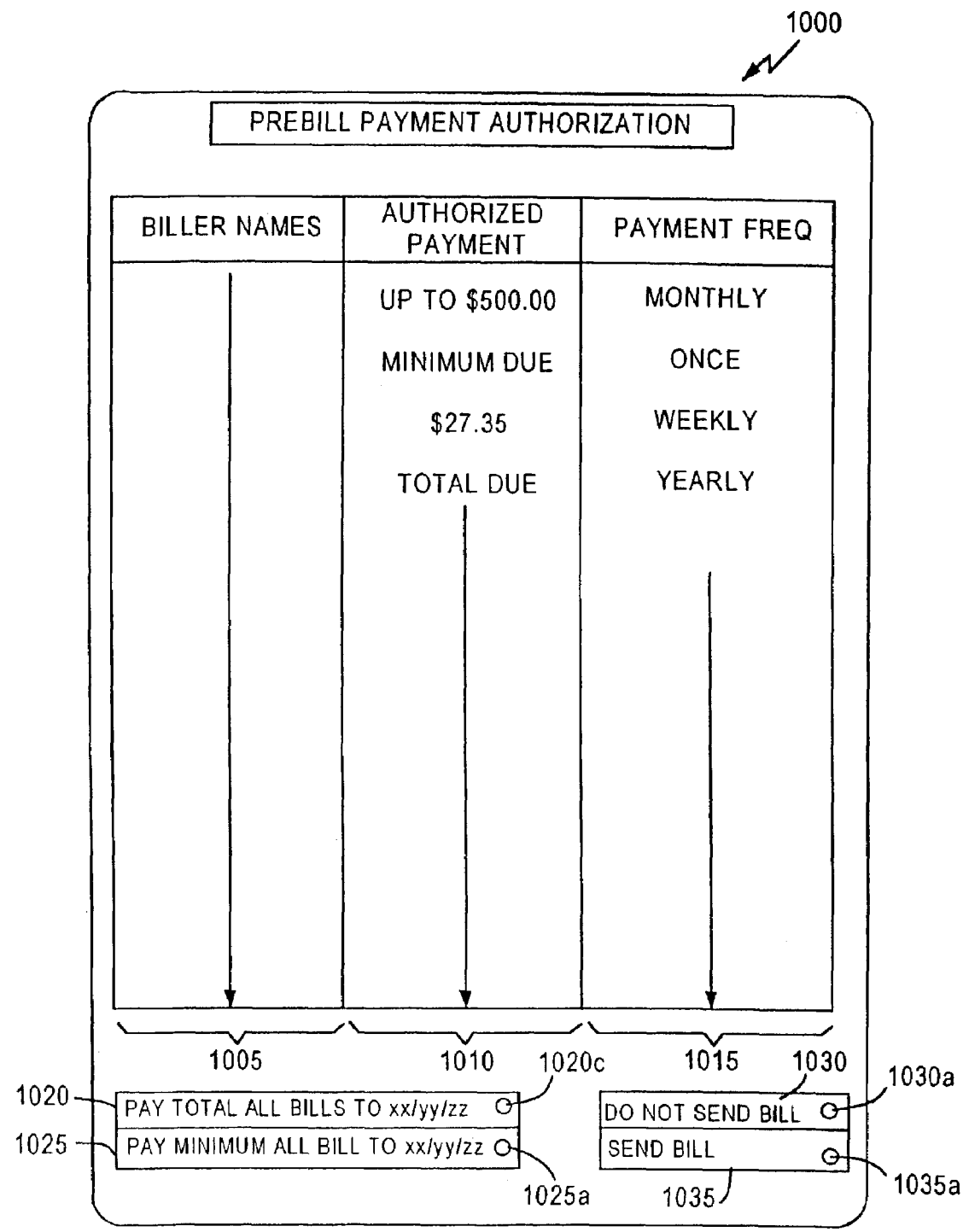
FIG. 10A depicts a pre-bill payment authorization screen in accordance with the present invention.

Turning now to FIG. 10A, a pre-bill payment authorization screen 1000 is shown. The screen is transmitted from the CF station 140 to the appropriate payor station 120*a*-120*d* for presentation on the payor station display 460. The pre-bill payment authorization screen 1000 allows the payor to identify billers in column 1005 whose bills are preauthorized by the payor for payment by the CF station 140. More particularly, the payor can designate in column 1010 a fixed payment amount, a maximum payment amount or an instruction to pay the total amount due or minimum amount due for any named biller. Further, the payor can specify, if so desired, in column 1015, a frequency at which such payments are authorized.

As shown in FIG. 10A, the payor can also authorize payment of the total amount billed for all billers identified by an asterisk 415 in FIG. 4 by filling in a period of authorization in block 1020 and clicking on indicator 1020*c*. Similarly, if the payor wishes to pre-authorize payments of the minimum amount due on all bills, the period of authorization can be inserted in block 1025 and indicator 1025*a* can be clicked on. As indicated by block 1030, an indicator 1030*a* can be clicked on to direct that notification of and bill presentment information associated with bills for which payment is pre-authorized not be forwarded to the payor. The payor also has the option, as indicated by block 1035, of clicking on indicator 1035*a* to receive notices and presentations of bill presentment information associated with the bills which have been pre-authorized for payment by the CF station 140.

Figure 10B:
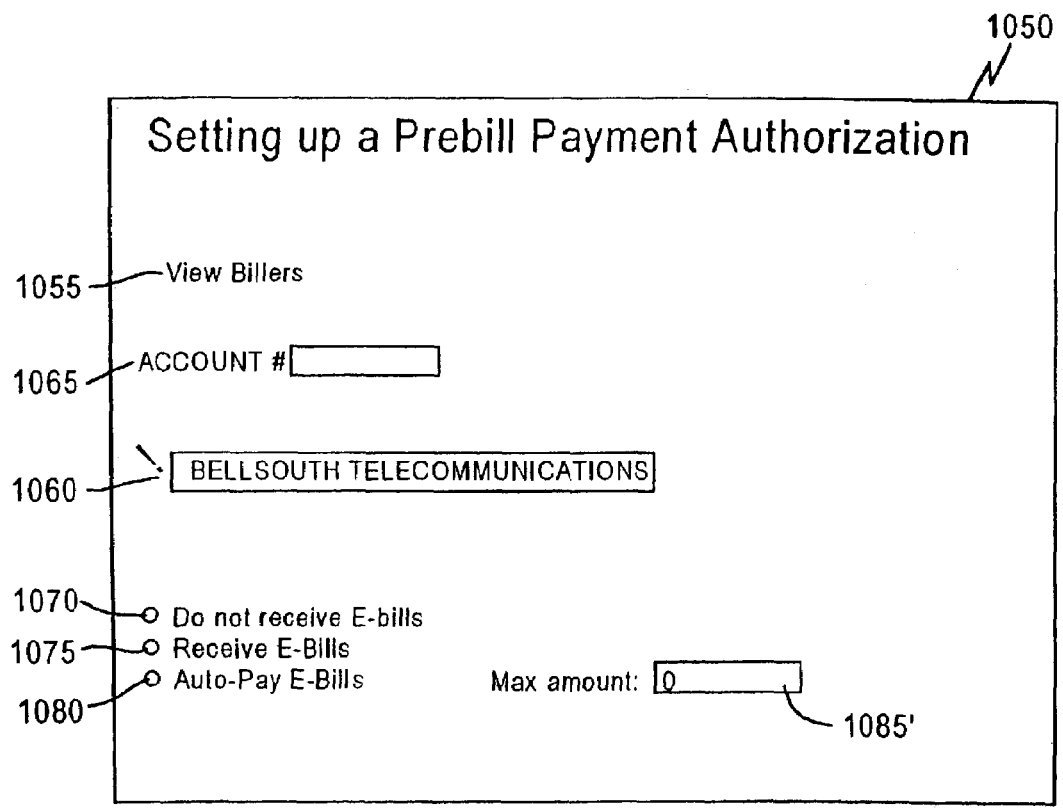
FIG. 10B depicts another pre-bill payment authorization screen in accordance with the present invention.

FIG. 10B depicts an alternative screen 1050 which may be utilized in setting up pre-bill payment authorization. Screen 1050 is transmitted from the CF station 140 to the applicable payor station 120*a*-120*d*. Billers identified in block 1060 and associated account numbers identified in block 1065 can be changed by clicking on indicator 1055. Alternatively, the payor can enter a biller name in block 1060 and the payor's account number with the particular biller payments will appear automatically in block 1065. By clicking on indicator 1070, the payor can direct the CF station 140 not to transmit notices and presentations of bill presentment information relating to the particular biller indicated. By clicking designator 1075, the payor can direct the CF station 140 to continue to transmit notices and bill presentment information regarding unpaid bills of the identified biller. By clicking on indicator 1080 after entering an amount in block 1085, the payor can pre-authorize the CF station 140 to pay bills of the indicated biller up to the maximum amount indicated without further authorization.

As indicated above, the payor station 120*a*-120*d* can also access the detailed bill related information stored at the CF station 140. As shown in FIG. 11, detailed bill presentment information, identified with referenced numeral 1110, is transmitted as screen 1100 by the CF station 140 responsive to a request for such information from the payor station 120*a*-120*d*. By clicking on indicator 1120, the payor station 120*a*-120*d* will issue an instruction directing the payment of the bill through the CF station 140. The bill can also be deleted from the screen by clicking on indicator 1125.

Figure 12A:
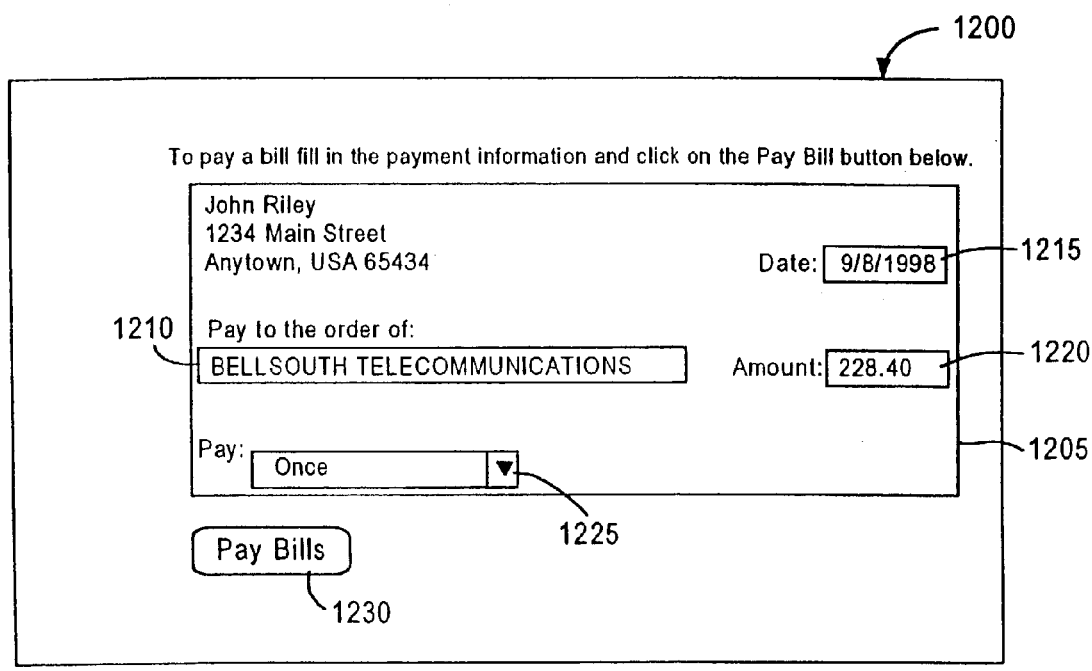
FIG. 12A depicts a bill payment authorization screen in accordance with the present invention.

Responsive to clicking on indicator 1120 at payor station 120*a*-120*d*, a screen 1200, as shown in FIG. 12*a*, is transmitted by the CF station 140. The screen 1200 includes a check 1205 which can be presented by the payor processor 450 on the display 460 at the payor station 120*a*-120*d*. The check 1205, as shown, resembles a conventional hardcopy personal check. The name of the applicable biller automatically appears in the block 1210. An appropriate payment date automatically appears in block 1215. It should be noted that the indicated payment date may pre-date the payment due date included on the bill presentment information of FIG. 11 to reflect when the payment must be made to ensure timely arrival and avoidance of late charges. The lead time may vary depending on the remittance method (hardcopy check or various forms of electronic funds transfer). The total bill amount is also automatically indicated in block 1220.

The payor can modify the date and amount of the payment if so desired. As an option, the payor can also indicate in block 1225 that the amount shown should be paid to the biller more than once, for example, monthly or semi-annually. This feature will typically be most useful where a fixed payment amount is payable on a fixed periodic basis to the applicable biller. The payor then clicks on the pay bill indicator 1230 to direct transmission of an instruction from the payor station 120*a*-120*d* to the CF station to make payment to the designated payee, i.e., biller, in the designated amount on the designated date.

Figure 12B:
FIG. 12B depicts a different bill payment authorization screen in accordance with the present invention.

FIG. 12B depicts an alternative bill payment screen 1250. Screen 1250 includes a check 1255 which is similar to check 1205 of FIG. 12A, but which can be used in connection with the payment of individual bills from a bill summary screen such as those previously described with reference to FIGS. 9A-9A. More particularly, responsive to the pay indicator, in the bill summaries shown in FIGS. 9A-9C, being clicked on at the payor station 120*a*-120*d*, the CF station 140 transmits screen 1250 to the payee station. The check 1255 includes block 1260 in which an individual biller's name can be inserted by scrolling through billers names appearing on the bill summary using the arrow indicator 1260*a*. The bill due date or a date which allows time for hardcopy mailing of a check to the biller automatically appears in the date block 1265 for the listed bill of the selected biller.

Figure 12C:
FIG. 12C details certain aspects of the bill payment authorization screen of FIG. 12B.

In the screen 1250, the block 1270 must be filled in by the payor to indicate the desired payment amount. Block 1275 can be scrolled by clicking on the arrow indicator 1275a to select the period of payment as has been previously discussed with reference to block 1225 in FIG. 12A. FIG. 12C further details screen 1250 to show that block 1275 can be expanded to provide multiple options with respect to the payment period for selection by the payor.

Once the check 1255 has been appropriately filled out the payor can then click on the pay bill indicator 1280 to transmit an instruction from the payor station 120a-120d directing the CF station 140 to pay the selected biller in accordance with information contained in the filled check 1255. If, on the other hand, changes in the check information are required, the payor can click on indicator 1285 to reset check 1255 and restart the process of selecting a biller for payment and filling in the amount of the payment to be made.

Referring to FIG. 13, a screen 1300, having a payment list 1305 including those bills which have been paid or on which instructions for payment have been received, is generated by the CF station 140. Responsive to a request from the payor, the screen 1300 is transmitted via the network 100 to the appropriate payor station 120a-120d. The screen 1300 is presentable on the payor display 460. The screen includes a listing of billers in column 1310 and a listing of the date on which payment has or will be made in column 1315. The amount of the authorized payment is listed in column 1320 along with the period at which such payment is authorized in column 1325. A payment confirmation number is referenced in column 1330. This number can be used to identify the particular transmission or payment of interest should the payor wish to make any inquiries to customer care regarding the payment. In column 1335, the status of the payment is indicated. For example, as indicated, the status may be that payment has been processed or may be pending awaiting a due date of payment. In column 1340, the payor is provided with various options depending upon the status of the payment. For example, where payment is pending, the payment authorization can be stopped or edited. In those cases where payment has been made, the payor can make inquiries relating to those payments.

Figure 14:
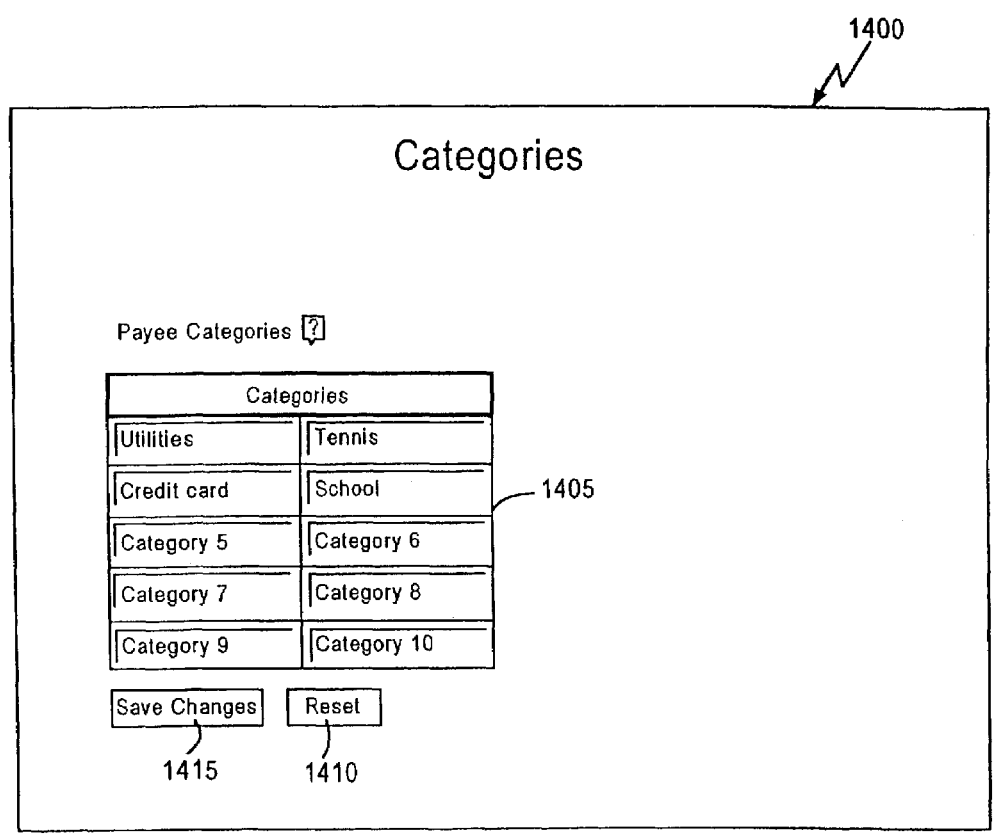
FIG. 14 depicts a biller category screen in accordance with the present invention.

FIG. 14 depicts a screen 1400 which, responsive to a request from a payor, is transmitted by the CF processor 140 to the payor station 120a-120d. Screen 1400 allows the payor to establish certain categories of billers, as has been previously discussed. For example, the biller may, in block 1405, establish categories for utilities, credit card companies, school, tennis related activities and any other categories as may be desired by an individual payor. By clicking on the reset indicator 1410, the payor can modify the listed categories. The selected categories and any changes to the category listings are saved by clicking on indicator 1415.

Figure 15:
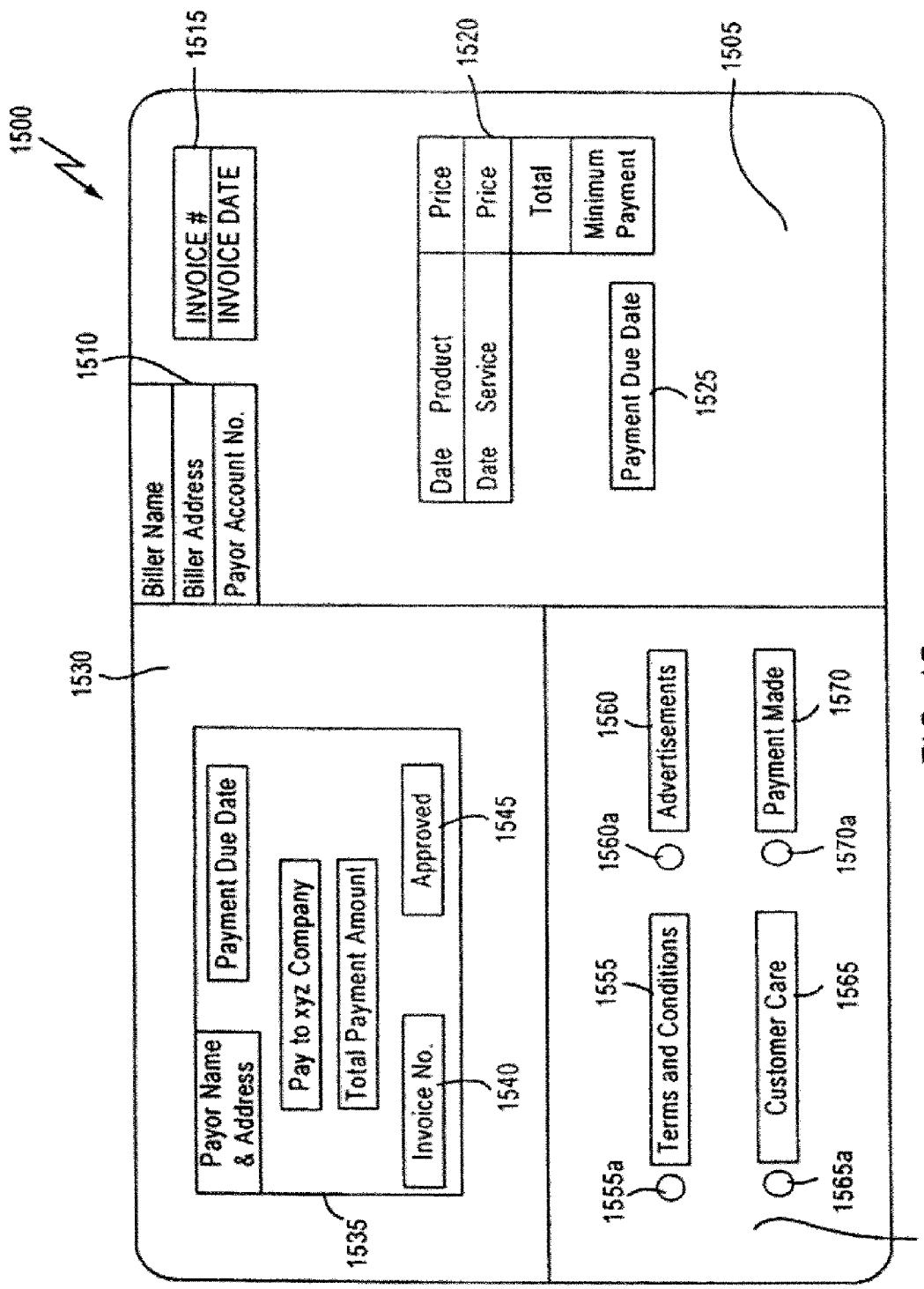
FIG. 15 depicts a screen having bill presentment and payment authorization information in accordance with the present invention.

FIG. 15 depicts a particularly beneficial screen 1500 for bill presentment and payment. As shown, the CF processor 140 transmits for presentation on the payor station display 460, a screen having an area 1505, which includes biller-specific bill presentment information, including the biller name, biller address and payor account number with the biller in block 1510. The area 1505 also includes a block 1515 having the biller invoice number and invoice date to the extent applicable. A block 1520 presents information which includes the purchase dates, product/service descriptions and the associated billed amounts, along with the total amount due and minimum payment due. A block 1525 indicates the payment due date.

In section 1530 of screen 1500, a check 1535 is shown which includes information similar to that of check 1205 which is described above with reference to FIG. 12A, with the exception that the check 1535 includes an invoice number in block 1540 and a click on indicator for approving the payment in block 1545. As in FIG. 12A, the payment due date and the total payment amount can be modified. An area 1550 of the screen 1500, has indicators which can be clicked on to access other information. As shown, indicator 1555a can be clicked on to access other terms and conditions as indicated in block 1555, and indicator 1560a can be clicked on to access advertisements which the biller wishes to include with the bill presentment as indicated in block 1560.

An indicator 1565a can be clicked on to access customer care as indicated in block 1565. The customer care access can, if desired, be similar to that described with reference to FIG. 8. Any customer care inquiry will automatically reference the particular account number referred to in area 1505 of the screen 1500, and may also reference the invoice number referred to in area 1505. By clicking on indicator 1570a, the payor can determine if payment has already been made as indicated by block 1570. If payment has been made, by clicking on indicator 1570a a canceled check stamp will appear on the check 1535 to indicate that the check has been cashed.

Accordingly, utilizing the screen 1500, a payor can access all information on a single screen necessary to review detailed bill presentment information relating to any particular bill, make payment of that bill in a desired amount and access other information, such as terms and conditions and advertisements, which would normally be included in a hardcopy mailing of bill. The payor can also determine that payment of the bill has in fact been received by the applicable biller. Should the biller have questions regarding the bill or payment, by simply clicking on indicator 1565a, customer care can be accessed.

Processing Payments to Billers and Other Payees

Payment processing will now be described in further detail with reference to FIGS. 16-21.

Figure 16:
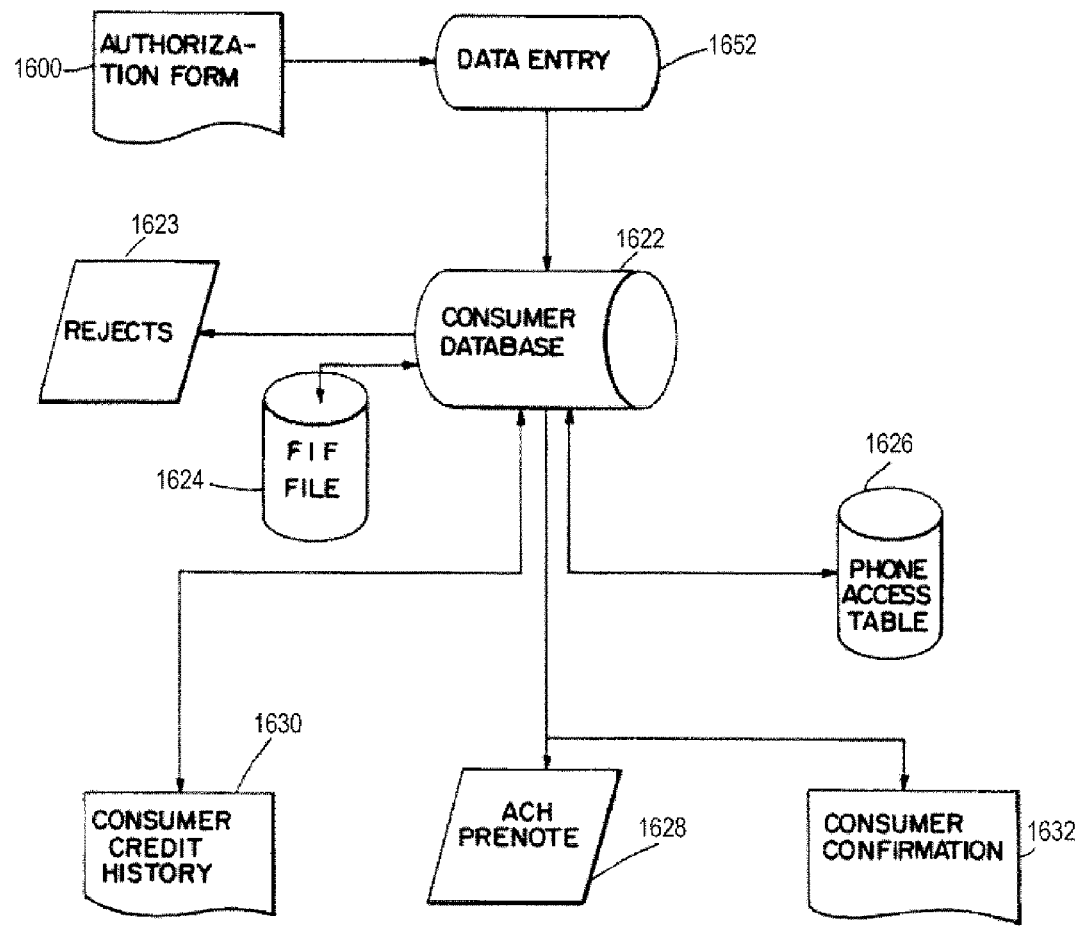
FIG. 16 is a diagrammatical representation of the creation of a consumer database in accordance with the present invention.

FIG. 16 illustrates the steps in the creation of a consumer database for use with the present invention. The first step in the process is to establish a consumer's data records on the system. This may be accomplished by the consumer completing an authorization form 1600, which may include some or all of the enrollment screens 500 and 600 shown in FIGS. 5 and 6, would contain the needed information to input into the system concerning the consumer. As has been discussed above with reference to FIG. 5, this information may include the consumer's name, address, telephone number and other applicable information. The consumer would also provide a voided check from the consumer's personal checking account, or the consumer's personal checking account information via the enrollment screen 600 as previously described with reference to FIG. 6.

The consumer's information may then be manually input via a keyboard 1652, or otherwise automatically entered into the consumer database record 1622, which forms part of the payor data 420b described above with reference to FIG. 2A. Default amounts may be set for an individual credit line parameter and for a total month-to-date parameter. These amounts establish the maximum unqualified credit risk exposure the service provider is willing to accept for an individual transaction and for the collective month-to-date transactions of a consumer. As explained hereinafter, the service provider may be at risk when paying a consumer's bills by a check written on the service provider's account.

From the voided check or entered checking account information, the consumer's bank routing transit and individual account numbers at an institution are input into the computer system. This information may be edited against an internal financial institutions file (FIF) database 1624 of the present invention. It will be recognized that the FIF database 1624 may also be stored at the memory 420 shown in FIG. 2A or could be stored at another location accessible to the CF processor 410. FIF 1624 is a database of financial institutions' identification codes and account information for the consumer. This file is used to edit[s] the accuracy of the routing transit number and the bank account number. If the numbers do not correspond with the correct routing and bank numbers, they are rejected in 1623 and the data entry is done again. FIF 1624 in conjunction with the software stored in area 420c of the memory 420 shown in FIG. 2A of the present invention also allows the CF processor 410 to update[s] the consumer database 1622 for both electronic and paper draft routing and account information. The needed information may be obtained from each banking institution and each consumer.

As appropriate, the consumer is notified by the service provider of his or her local phone number access and personal security code for informing the service provider that a bill is to be paid. This information may be stored in a phone access table 1626. Of course, no local access phone number is required if the Internet will be used to inform the service provide that a bill is to be paid. The personal security code may be much like an ATM machine four digit code.

In addition, to the extent necessary or as otherwise desired to comply with federal law, an electronic pre-note 1628 will be created to be sent to the consumer's bank to inform the bank that the service provider is authorized to debit the consumer's account. For further security to the service provider, a consumer credit record 1630 may be obtained. The default credit limit amounts over which the service provider may be unwilling to assume financial risk may be modified based on the information obtained from the credit report 1630.

Figure 17:
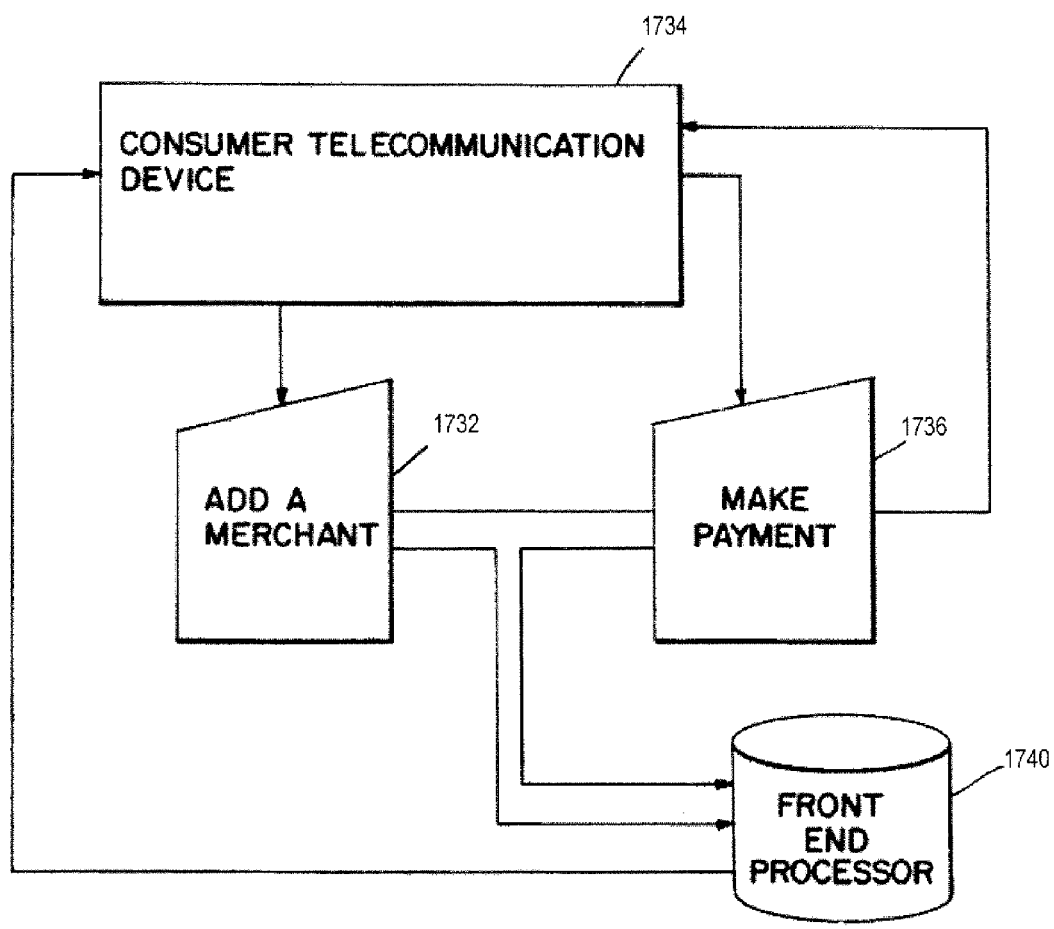
FIG. 17 is a diagrammatical representation of the establishment of a merchant's (billing entities) database and the making of payments in accordance with the present invention.

In FIG. 17 the steps are shown for establishing merchants to be paid and the making of a payment. The consumer must inform the service provider or processor of a merchant's name, address, phone number and the consumer's account number with the merchant 1732. As described above with reference to FIG. 4, this can be done using enrollment form 550, which avoids the need for the consumer to enter all of the necessary information for billers named in the listing in block 560. The term "merchant" as used herein is intended to pertain to any person or entity that the consumer wishes to pay and is not to be limited to the usual merchants most consumers pay, such as the electric company, a home mortgage lender, etc. Thus, the term "merchant" should be understood to include the billers describe above, as well as any other payee. This information is put into a merchant master file database 1842 (MMF), to the extent it is not already included in the MMF 1842. The MMF 1842 and the addition of merchants to the MMF 1842 will be further described with reference to FIGS. 18 and 19. The MMF 1842 is stored as payee data in area 420a of the memory 420 shown in FIG. 2A.

The consumer may also indicate whether the merchant is a variable or fixed merchant. A variable merchant is one in which the date and amount of payment will vary each month. A fixed merchant is one in which the date and amount remain the same each month. If the merchant is fixed, the frequency of payment may be other than monthly, such as weekly, quarterly, etc. The consumer should inform the service-provider of the date on which the merchant is to be paid and the amount to be paid.

Through a telecommunications terminal 1734 (e.g., a push-button telephone such as telephone 430 or mobile phone 340 of FIG. 3, or computer terminal such as the PC 310 or notebook computer 350 of FIG. 3, which serves as the payor station 120 described in FIG. 2B), a consumer may initiate payment of bills 1736. Through the terminal, the consumer may access his merchant list and input the payment date and amount. The system may be provided with a payment date editor to insure that the date is valid and logical (i.e., payment dates already in the past or possibly a year or more into the future would be questioned). The consumer interfaces with the service provider via a front end processor 1740 communicating through a network. The front end processor 1740 may, for example, form part of the CF process 410 of CF station 140 shown in FIG. 2A.

As payments are initiated, a consumer "checkbook register" may be created and automatically updated to reflect this activity. The merchant list can be visible on the consumer's personal computer screen, e.g. display 460 of the payor station 120 shown in FIG. 2B. On a personal computer a consumer may enter merchant payment amounts and payment dates, e.g. using input device 465 of the payor station 120 shown in FIG. 2B, on the computer screen, e.g. display 460 of the payor station 120 shown in FIG. 2B, and then transmit this information to the service provider, e.g. using the network interface 455 of the payor station 120 shown in FIG. 2B.

By telephone, the list may be presented by programmed voice. The voice may be programmed to ask the consumer if a particular merchant (selected from the consumer's MMF, which may be updated from time to time) is to be paid and to tell the consumer to press 1 if yes, or press 2 if no. If yes, the voice may instruct the consumer to enter the amount to be paid by pressing the numbers on a touch tone phone. The asterisk button could be used as a decimal point. After the amount is entered, the voice may ask the consumer to enter the date on which payment is to be made to the merchant. This may be accomplished by assigning each month a number, such as January being month 01. The consumer may then enter month, day and year for payment. The programmed voice may be accomplished with a VRU (voice response unit) available from AT&T or other vendors. It may communicate with a data processor to obtain consumer information. At the end of the consumer's session on the terminal a confirmation number may be sent to the consumer, in step 1632, providing a record of the transaction.

Figure 18:
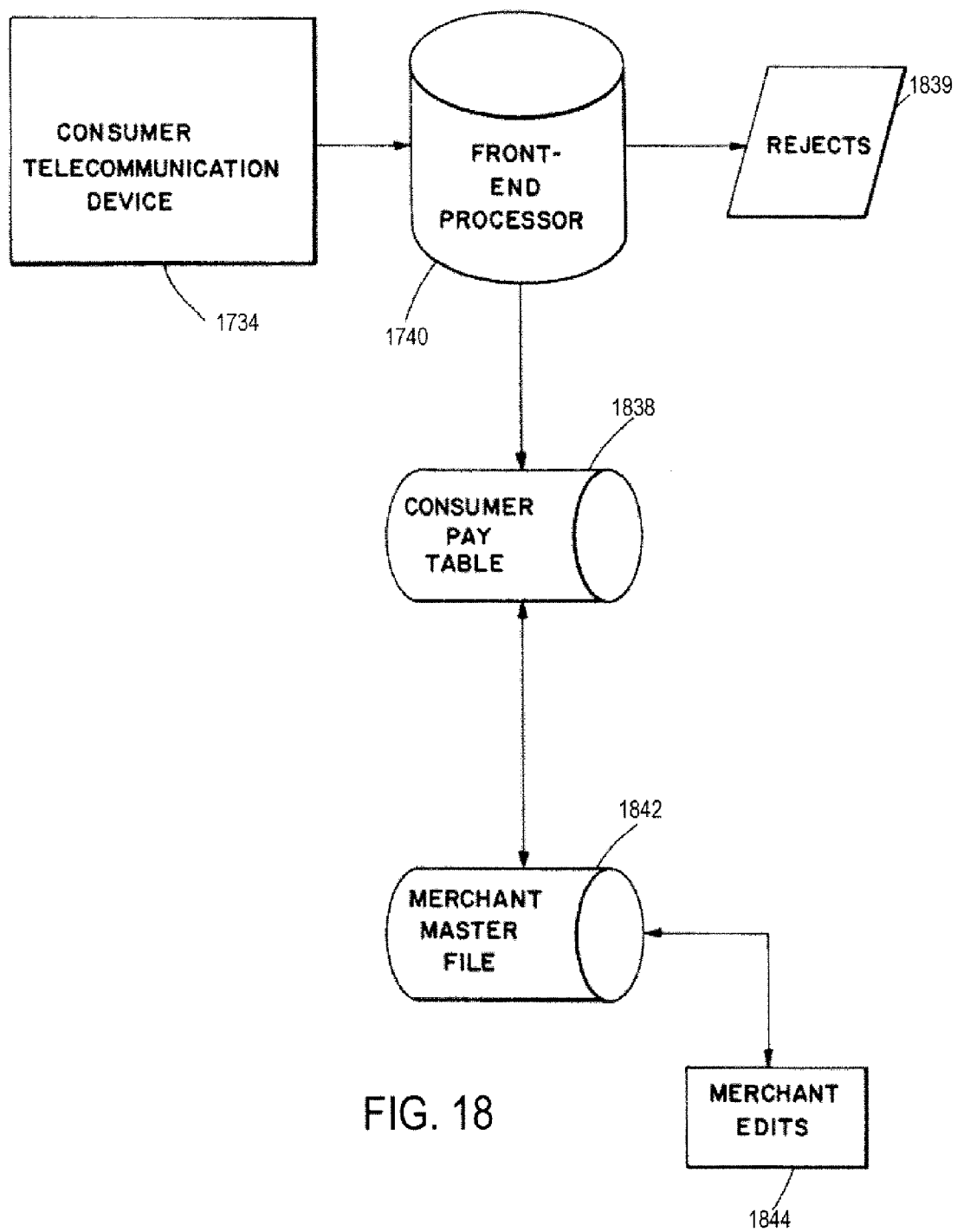
FIG. 18 is a diagrammatical representation of the creation of a consumer pay table in accordance with the present invention.

In FIG. 18 the steps are shown for the creation of the consumer pay table 1838 and making updates to it. The consumer's files of payment related requests may be received at the service provider on a front end processor 1740 that interfaces with the telecommunications network, e.g. the network 100 of FIGS. 1 and 2. The consumer's records may be edited 1844 for validity by comparing to the merchants' account scheme. Any new merchant records, from step 1732 of FIG. 17, are added to the consumer's pay table 1838. New merchants are compared to the MMF 1842 and appropriately cross-referenced to the pay table 1838 to check if a merchant record already exists in the MMF 1842. If no merchant record exists, a merchant record will be created on the MMF 1842.

Payment records may also be received on the service provider's processor. The payment may first go through a validation process against the pay table 1838. The validation process checks for duplicate payments and if duplicates are found they are sent to a reject file 1839. The validation process also verifies that merchants are set up and may check for multiple payments to be paid to a particular merchant. Orders for payment go to the consumer pay table 1838 to determine when the payment should be released and how it will be released for payment. The consumer pay table 1838 can be stored as payor data in area 420b of memory 420 within CF station 140 shown in FIG. 2A.

The service provider may pay merchants by a draft or check (paper) or by electronic funds transfer. To create a draft that will pass through the banking system, it must be specially inked. This may be accomplished by a printer which puts a microcode on drafts, like standard personal checks.

Figure 20:
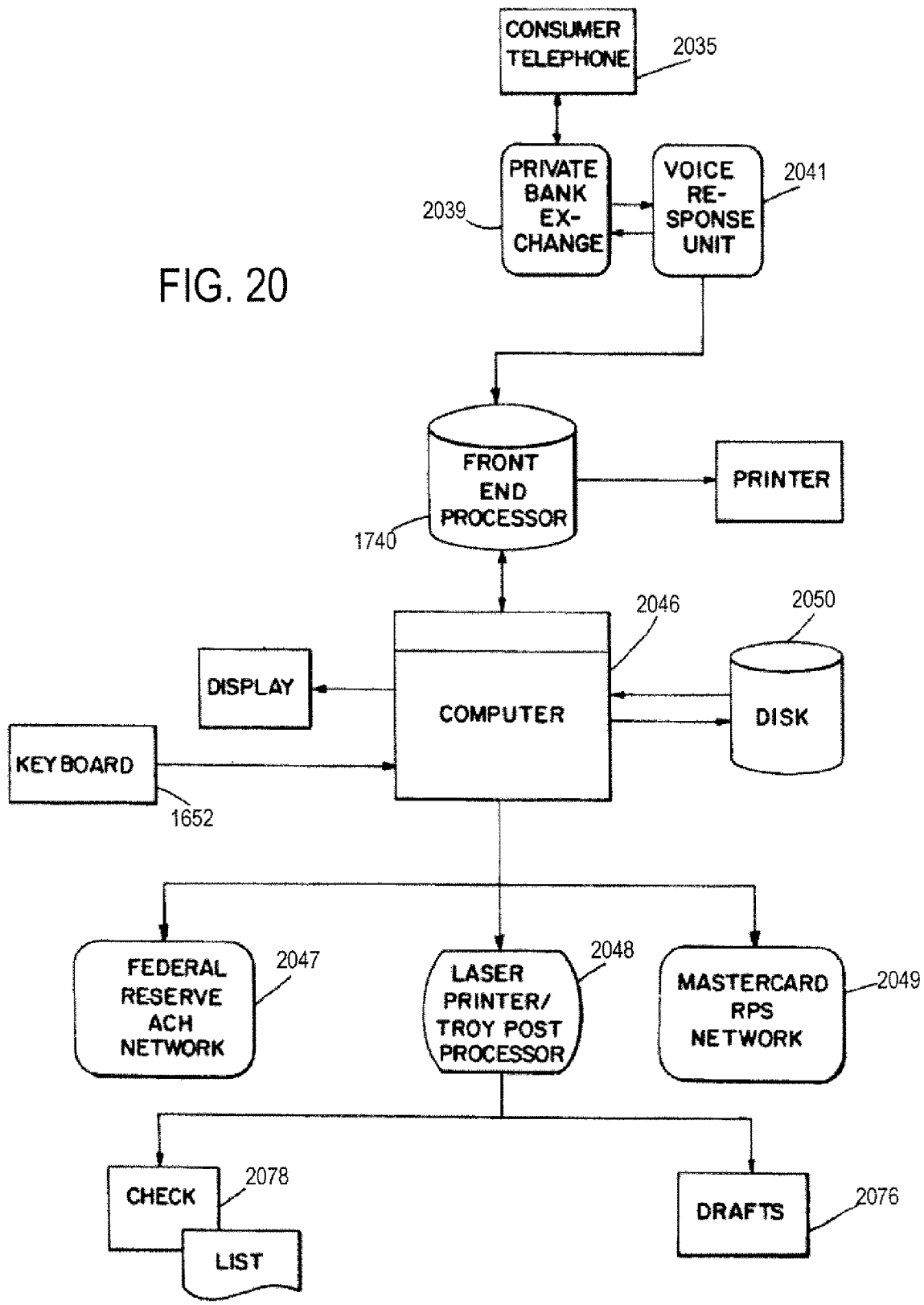
FIG. 20 is a diagrammatical representation of a computer hardware system that may be used for creating a consumer database and a consumer pay table, establishing a merchant's database, and accomplishing the payment processing cycle shown in FIGS. 16-19C.

For example, as shown in FIG. 20, the front end processor 1740 may be a DEC VAX which is connected to an IBM main frame 46 Model 4381. Consumers may call by telephone 2035, a number that passes through the private bank exchange (PBX) 2039 and contacts a voice response unit 2041 in association with the front end processor 1740. The telephone 2035 could, for example, be a hard wired phone such as telephone 430 of FIG. 3 or a wireless phone such as mobile phone 340 of FIG. 3. The private bank exchange (PBX) 2039 could be part of the network 100 shown in FIGS. 1 and 2.

After the consumer's payment instructions are received an analysis is performed to determine the most cost effective and least risk mode of payment for the service provider to use. One preferred mode of payment is electronic funds transfer through the Federal Reserve Automated Clearing House (ACH) Network 2047, which could be part of the network 100 shown in FIGS. 1 and 2. If the service provider is not a bank, a bank intermediary may be needed to be connected to the Federal Reserve Network. Another payment mode is a charge to the consumer's credit card through the RPS Network 2049, which could also be part of the network 100 shown in FIGS. 1 and 2. Additionally, an IBM Laser Printer attached to a micro post printer 2048 may be used by the service provider to send drafts 2076 or consolidated checks 2078 to merchants.

The main frame 2046, the functionality of which can be included in the CF processor 410 of CF station 140 shown in FIG. 2A, has data storage means 2050, which may form part of the memory 420 of CF station 140 shown in FIG. 2A, and runs the FIF 1624 and MMF 1842 programs, which may be stored in the area 420c of the memory 420 in CF station 140 shown in FIG. 2A. It may also have a tape drive or telecommunication interface, such as interface 405 of the CF station 140 shown in FIG. 2A, for accomplishing electronic funds transfer. It should be recognized that various other hardware arrangements could be used to accomplish the present invention.

Figure 21:
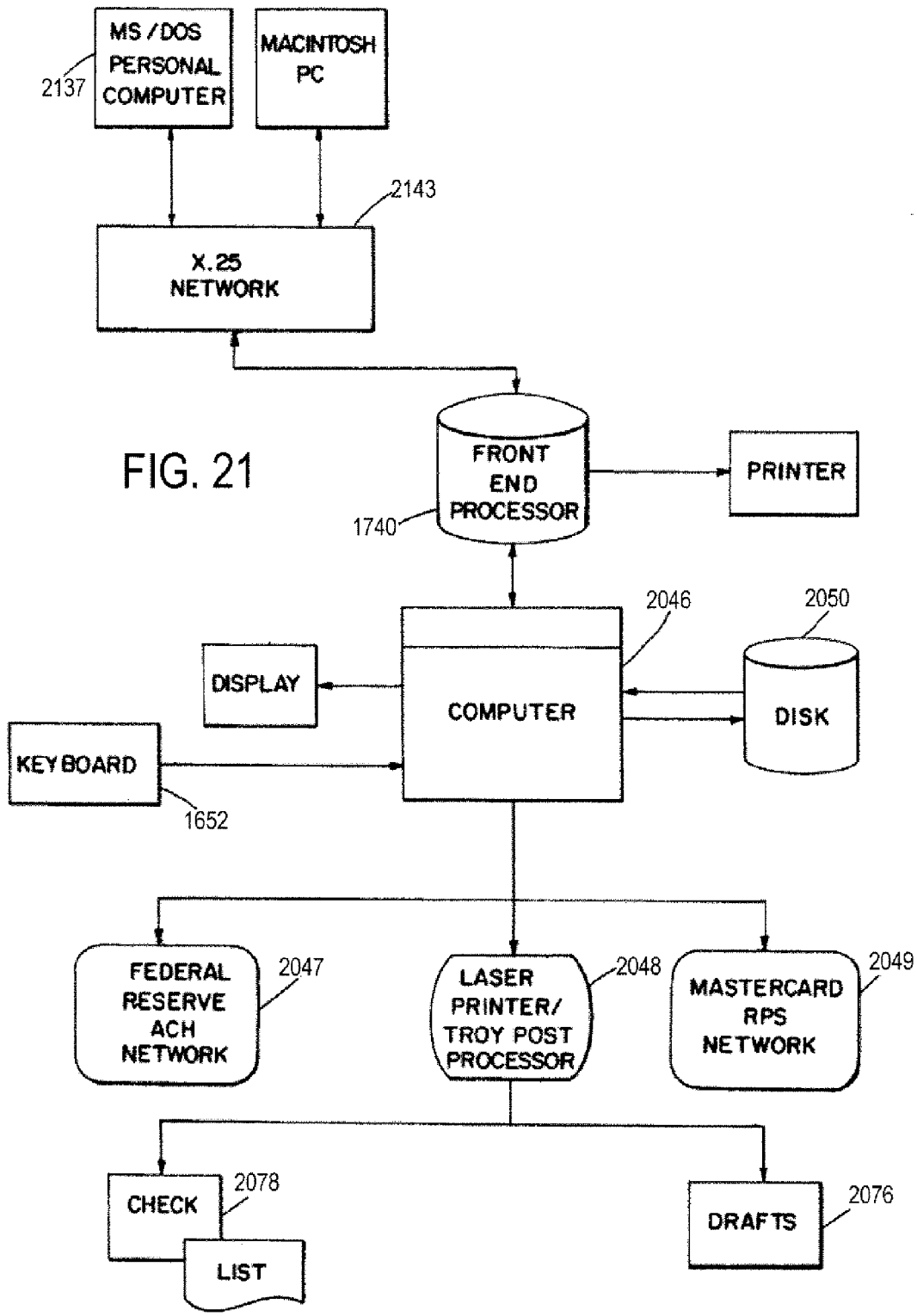
FIG. 21 is a diagrammatical representation of another computer hardware system that may be used for creating a consumer database and a consumer pay table, establishing a merchant's database, and accomplishing the payment processing cycle shown in FIGS. 16-19C.

FIG. 21 illustrates a similar arrangement for use when the consumer is using a personal computer 2137, which is shown to be either a MS/DOS or Macintosh PC, to instruct the service provider. The personal computer may access the front end processor 1740 through the standard X.25 Network 2143, which could be part of the network 100 shown in FIGS. 1 and 2.

Figures 19A, 19B:
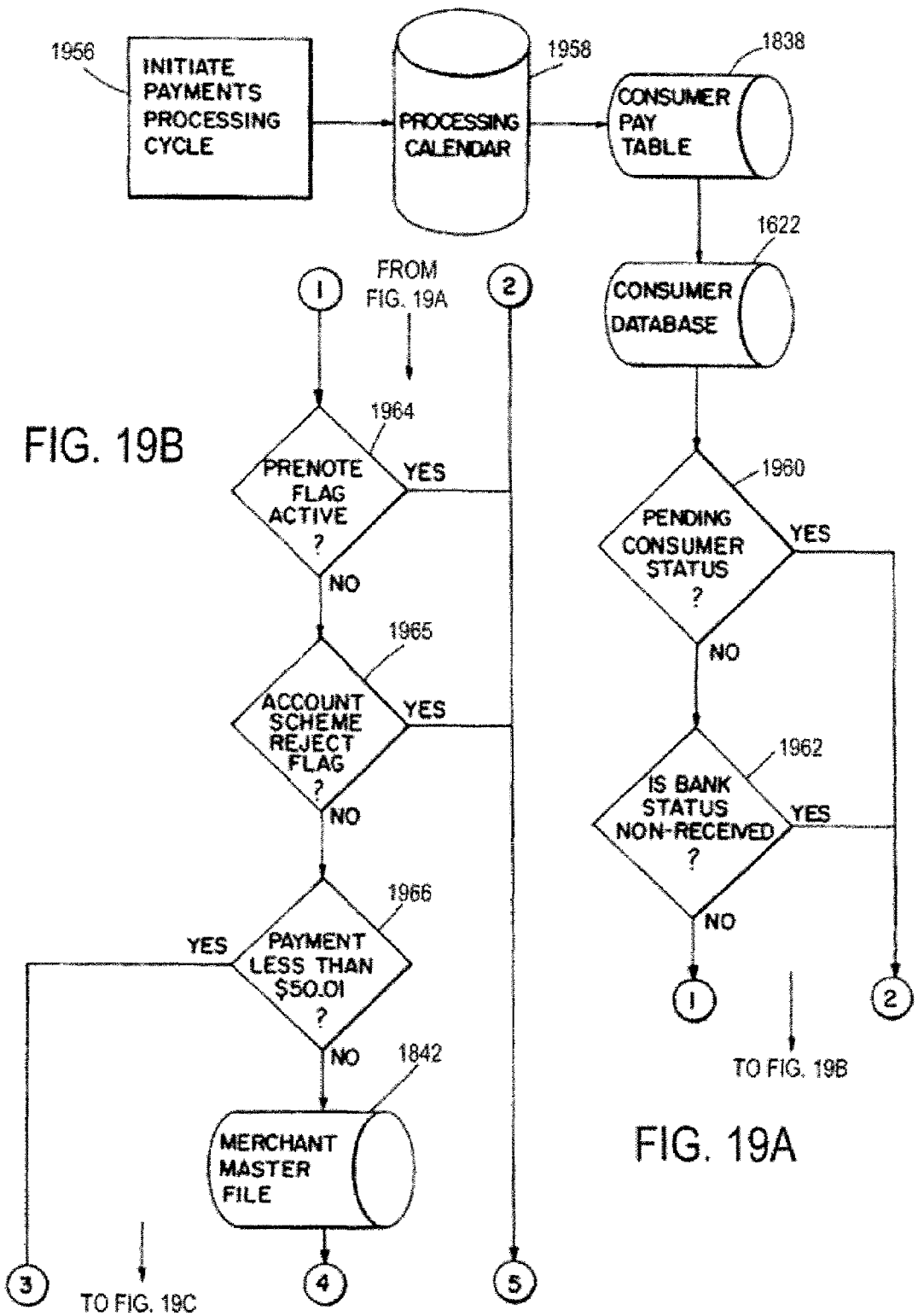
FIG. 19A is a diagrammatical representation of a payment processing cycle in accordance with the present invention.
FIG. 19B is a continuation of the diagram of FIG. 19A.
Figure 19C:
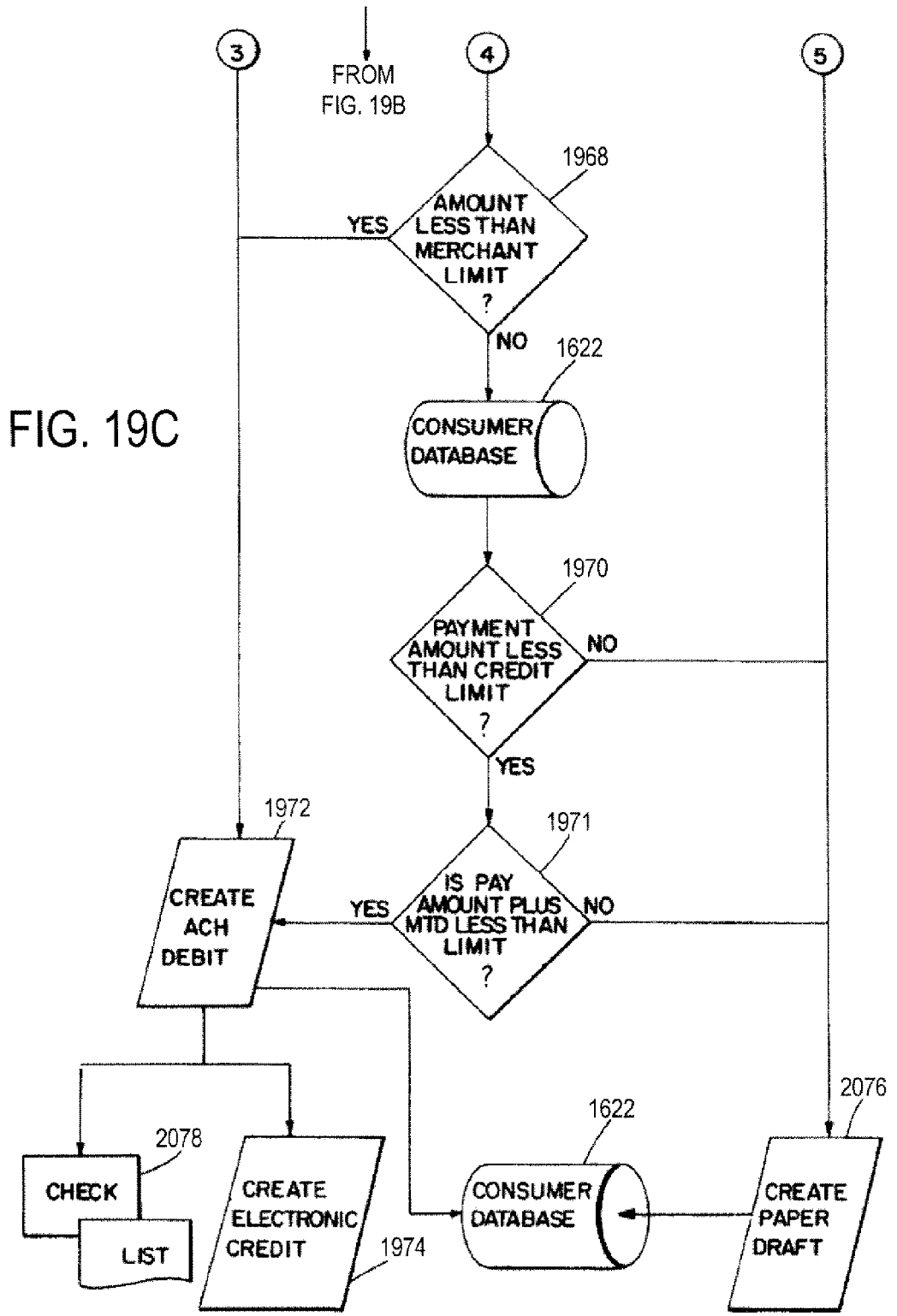
FIG. 19C is a continuation of the diagram of FIG. 19B.

Referring now to FIGS. 19A, 19B and 19C, the payment process is shown. This process may be performed by the CF station 140 in accordance with the bill payment software stored in area 420c of the memory 420 as shown in FIG. 2A.

The payment process may be cycled 1956 each day or more or less frequently. The first step is to establish when payment items are to be processed. This may be accomplished through a processing calendar 1958. A processing calendar 1958 may be built into the system, e.g. stored in the area 420c of the memory 420 in the CF station 140 shown in FIG. 2A. The calendar 1958 enables the system to consider each date, including weekends and the Federal Reserve holidays. Payments are released from the consumer pay table 1838 using the due date. Any bank date, payments, or payments within a period such as four business days may be released the same day. All future payment dates would be stored in the consumer pay table 1838. On-line inquiry may be made on the consumer pay table 1838. The service provider has on-line capability to make changes to the consumer payment upon request until the day the payment is released. A consumer's merchant change may also affect the consumer's payment on the pay table 1838.

The method of payment to the merchant may be either paper (draft or check) or electronic. There are several factors in the process used to determine if a payment will be released as a paper item, or an ACH electronic transaction (automated clearing house; service provider is a party to transaction).

Each consumer may be assigned a status such as: active=good; inactive=bad; and, pending=uncertain, risky. If a consumer's status is pending 1960, when reviewing the payment file with the processing calendar 1958, the payment should go out as a draft paper 2076, as shown in FIG. 19C, to protect the service provider. When payment is made by draft, the service provider is not a contractual party to the transaction. The consumer's bank account codes are actually encoded onto the draft prepared by the service provider and act much like the consumer's personal check. The draft has been specially designed for this process. The draft is payable to either the service provider or the particular merchant. This allows the draft to be delivered to the merchant for payment and depositing, but allows the draft to be legally payable by the bank, with proper authorization. Additionally, posting information for the merchant is contained on the body of the draft. To the applicant's knowledge, it is the first time a draft has been used in such a manner and with this unique design to accomplish this.

If the consumer's bank transit number does not indicate an electronic bank 1962 (i.e., a banking institution that will accept electronic funds transfer), the program associated with FIF 1624, which may be stored in the area 420c of the memory 420 in the CF station 140 shown in FIG. 2A, sends the payment as a draft. A pre-note 1628 is required any time, step 1964 determines, new banking information is entered on a consumer and the bank shows on FIF 1624 as an electronic receiving bank. The pre-note period is ten (10) days under federal law. Any payments released during this period are sent as paper.

The third manner in which the service provider may pay bills is by a check written on the service provider's account 2078. A consolidated check may be written if many customers have asked the service provider to pay the same merchant. Under this method of payment the service provider assumes some risk since the service provider writes the check on its own account. The service provider is later reimbursed by the (consumer's) banking institution.

As a means of minimizing risk to the service provider, any transaction may be compared to the MMF 1842 credit limit. For example, if the check limit is greater than zero and the payment is $50.00 or less in step 1966, the item may be released as electronic 1974 or by service provider check 2078. If the payment is greater than $50.00 but less than or equal to the merchant credit limit, as determined in step 1968, the payment may be released as an electronic payment 1974 or check 2078. Any payments within the merchant's credit limit, as determined in step 1968, are added to the consumer's monthly ACH balance in step 1972. This provides a monthly total billing day to billing day summary of the consumer's electronic payment activity. Any transaction may be compared to the consumer's database 1622 credit limit parameters. If a payment amount is greater than the consumer's credit limit, as determined in step 1970, the item is released as a draft 2076 which is written on the consumer's account. If the payment amount plus the total of electronic payments in a particular month is greater than the consumer's credit limit in step 1971, the item is released as a draft 2076. Items not released as paper are initiated as an ACH debit against the consumer's account in step 1974.

The consumer database 1622 may be reviewed for proper electronic funds transfer (EFT) routing. Payment to the merchant may be accomplished one of three ways, depending on the merchant's settlement code. Various merchant's settlement codes may be established. For example, a merchant set up with a settlement code "01" results in a check and remittance list 2078 being mailed to the merchant. Merchants with a settlement code, such as "10" produce an ACH customer initiated entry (CIE). Merchants with a settlement code, such as, "13" produce a remittance processing system (RPS) credit.

In the consumer pay table 1838, for fixed payments, a payment date gets rolled to the next scheduled payment date on the pay table. The number of remaining payments counter is decreased by one for each fixed payment made. For variable payments once made, the payment date is deleted on the consumer pay table 1838. The schedule date and amount on the consumer pay table roll to zero. A consumer payment history may also be provided which show items such as process date as well as collection date, settlement method, and check number in addition to merchant name and amount.

The software of the present invention is designed in part to make several decisions relating to particular transactions for consumers. The following example is provided to more fully describe the software. This example is not intended to limit the application to the details described in the example and is only provided to further enhance the description of the invention already stated above.

For this example, assume that a consumer has five transactions of varying amounts for which the consumer has asked the service provider to arrange payment. For simplicity, assume that the five payments are to be made on the same day. First, the consumer database 1622 is edited to validate the status, banking institution, and pre-note flags associated with the consumer's requested payments, in steps 1960, 1962 and 1964. The account numbers provided by the consumer for the merchants to be paid, are also checked to determine if they are valid in step 1965. Assuming the merchant account numbers are valid, the program begins with the first dollar analysis.

For purposes of this example, the five payments the consumer has requested are in the amounts of: $25.00; $75.00; $150.00; $250.00; and $1,000.00. The program will consider each dollar amount individually as it goes through the various edit modes. The first edit may be called a $50.01 edit in step 1966. In this example, any transaction that is less than $50.01 is automatically sent as an ACH debit, in step 1972, to the consumer's account. This means that the service provider uses ACH to electronically transfer funds from the consumer's account to the service provider's clearing account.

In this example, the initial payment of $25.00 will satisfy the $50.01 edit and therefore will be paid without any further edits being conducted for this particular payment. Continuing with the example, the next edit may be a merchant dollar edit in step 1968 that is established for the specific merchant to which the transaction is being sent. For purposes of this example, this edit is set at $100.00 for all merchants. Different dollar edits can be incorporated for different merchants. In the example, the second payment request of the consumer, for $75.00, meets the $100.00 merchant edit parameter and is sent as an ACH debit to the consumer's account. Note that the $75.00 payment would not have satisfied the $50.01 edit and therefore would have passed on to the second edit which in this case, is the merchant dollar edit.

The remaining three payments in the example exceed both the $50.01 edit and the merchant $100.00 edit and therefore, go to the next edit. In the example, the next edit is for a consumer individual transaction limit set at $200.00 in step 1970. The $150.00 payment is less than the $200.00 consumer individual transaction limit and is, therefore, sent as an ACH debit to the consumer's account and paid. The other two remaining payments yet to be made exceed the $200.00 limit in this example and pass to the next edit.

In the next edit, which happens to be the last edit in the example, the consumer's month-to-date "unqualified" risk limit is checked. In the example, the month-to-date limit is set at $1,500. Assume that for this particular consumer $400.00 of month-to-date payments have already been made on the consumer's behalf. Added to the $400.00 would be the three payments made above for $25.00, $75.00 and $150.00. So an additional $250.00 is added to the $400.00 month-to-date for a total of $650.00 "unqualified" risk for the current month-to-date amount in step 1971. The next payment to be made is for $250.00 and would fall within the $1,500 month-to-date limit when added to the current $650.00 risk amount. Therefore, the $250.00 payment is made and an ACH debit is sent to the consumer's account. This brings the total month-to-date "unqualified" risk amount to $900.00. The final $1,000 payment has not been paid and would send the "unqualified" risk amount over $1,500 when added to the $900.00. Since the final payment of $1,000 in the example fails the consumer month-to-date limit edit, the $1,000 payment would be sent as a paper draft directly drawn on the consumer's account, and for which the service provider has no liability. In the example, the final step would be updating the consumer month-to-date current total to $900.00.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

We claim:

1. A computer implemented method for billing and payment, comprising:
    transmitting, to a first of a plurality of payors, bill information representing a first of a plurality of bills from a first of a plurality of billers to the plurality of payors, wherein the first bill is associated with the first payor;
    receiving a payment instruction from the first payor to pay the first bill based on the transmitted bill information;
    determining, by a service provider, a credit risk associated with payment of the first bill on behalf of the first payor from an account associated with the service provider;
    selecting, by the service provider, an account to debit from the group consisting of (i) an account associated with the first payor and (ii) the account associated with the service provider based upon the determined credit risk, wherein the selection of the account is made independently of the first payor and the first biller; and
    initiating, by a service provider, a payment of the first bill to the first biller based on the received payment instruction and the selected account.

2. The method recited in claim 1, wherein:
    at least one of the account associated with the first payor and the account associated with the service provider is a deposit account.

3. The method recited in claim 1, wherein:
    if the account associated with the first payor is selected for debiting, the payment is initiated by directing preparation of a negotiable instrument payable to the first biller drawn on the account associated with the first payor; and
    if the account associated with the service provider is selected for debiting, the payment is initiated by one of (i) directing an ACH crediting to an account associated with the first biller of funds from the account associated with the service provider, (ii) directing another type of Remittance Processing System (RPS) crediting to the first biller of funds from the account associated with the service provider and (iii) directing preparation of a negotiable instrument payable to the first biller drawn on the account associated with the service provider.

4. The method recited in claim 3, further comprising:
    if the account associated with the service provider is selected for debiting, obtaining funds corresponding to the amount of the payment from the account associated with the first payor.

5. The method recited in claim 1, wherein:
    the received payment instruction has an associated payment amount; and
    the credit risk is determined based on a relationship between the payment amount and a payment amount threshold associated with at least a portion of the plurality of payors.

6. The method recited in claim 1, wherein:
    the received payment instruction has an associated payment amount; and
    the credit risk is determined based on a relationship between the payment amount and a payment amount threshold associated with the first biller.

7. The method recited in claim 1, wherein:
    the received payment instruction has an associated payment amount; and
    the credit risk is determined based on a relationship between the payment amount plus a sum of other payment amounts associated with other payment instructions which have been received from the first payor for payments within a time period and a payment amount threshold.

8. The method recited in claim 4, wherein obtaining funds corresponding to the amount of the payment includes directing an ACH debit from the account associated with the first payor.

9. The method recited in claim 5, wherein:
    the credit risk is determined based on a relationship between the payment amount and a payment amount threshold associated with one of: (i) the first payor, (ii) at least two of the plurality of payors, wherein the at least two payors includes the first payor, and (iii) all of the plurality of payors.

10. An integrated billing and payment system, comprising:
    a memory configured to store bill information representing a first of a plurality of bills from a first of a plurality of billers to a first of a plurality of payors, wherein the first bill is associated with the first payor; and
    a processor configured to direct transmission of the stored bill information to the first payor, to receive a payment instruction from the first payor to pay the first bill based on the transmitted first information, to determine a credit risk associated with payment of the first bill on behalf of the first payor from an account of a service provider, to select an account to debit from the group consisting of (i) an account associated with the first payor and (ii) the account associated with the service provider based upon the determined credit risk, and to initiate a payment of the first bill to the first biller based on the received payment instruction and the selected account, wherein the selection of the account is made independently of the first payor and the first biller.

11. The system recited in claim 10, wherein:
    at least one of the account associated with the first payor and the account associated with the service provided is a deposit account.

12. The system recited in claim 10, wherein:
    if the account associated with the first payor is selected for debiting, the processor is further configured to initiate the payment by directing preparation of a negotiable instrument payable to the first biller drawn on the account associated with the first payor; and
    if the account associated with the service provider is selected for debiting, the processor is further configured to initiate the payment by one of (i) directing an ACH crediting to an account associated with the first biller of funds from the account associated with the service provider, (ii) directing another type of crediting to the first biller of funds from the account associated with the service provider, and (iii) directing preparation of a negotiable instrument payable to the first biller drawn on the account associated with the service provider.

13. The system recited in claim 12, wherein:
    if the account associated with the service provider is selected for debiting, the processor is further configured to obtain funds corresponding to the amount of the payment from the account associated with the first payor.

14. The system recited in claim 10, wherein:
    the memory is further configured to store a single payment amount threshold associated with at least a portion of the plurality of payors;
    the received payment instruction has an associated payment amount; and the processor is further configured to determine the credit risk based on a relationship between the payment amount associated with the received payment instruction and the stored single payment amount threshold.

15. The system recited in claim 10, wherein:
the memory is further configured to store a respective payment amount threshold associated with the first biller;
the received payment instruction has an associated payment amount; and
the processor is further configured to determine the credit risk based on a relationship between the payment amount and the stored respective payment amount threshold associated with one of the first payor and the first biller.

16. The system recited in claim 10, wherein:
the memory is further configured to store a payment amount threshold;
the received payment instruction has an associated payment amount; and
the processor is further configured to compute a sum of the payment amount associated with the received payment instruction and other payment amounts associated with other received payment instructions for other payments within a time period, and to determine the credit risk based on a relationship between the computed sum and the stored payment amount threshold.

17. The system recited in claim 13, wherein the processor is configured to obtain funds corresponding to the amount of the payment by directing an ACH debit from the account associated with the first payor.

18. The system recited in claim 14, wherein the memory is configured to store the single payment amount threshold associated with one of (i) the first payor, (ii) at least two of the plurality of payors, wherein the at least two payors includes the first payor, and (iii) all of the plurality of payors.

19. The system recited in claim 15, wherein the memory is further configured to store a respective payment amount threshold associated with one of (i) each of the plurality of payors and (ii) each of the plurality of billers.

20. The system recited in claim 16, wherein the other received payment instructions for other payments with the time period are associated with the first payor.

21. An integrated billing and payment network, comprising:
a communications network;
a first station, associated with a service provider, configured to transmit to a first of a plurality of payors via the communications network, bill information representing a first of a plurality of bills of a first of a plurality of billers for the plurality of payors, wherein the first bill is associated with the first payor; and
a second station, associated with the first payor, configured to receive the transmitted bill information via the communications network, to present the first bill to the first payor based on the received bill information, and to transmit, via the communications network, a first payment instruction to pay the presented first bill;
wherein the first station is further configured to receive the first payment instruction via the communications network, to determine a credit risk associated with payment of the first bill from an account of a service provider, to select an account to debit from the group consisting of (i) an account associated with the first a or and (ii) the account associated with the service provided based on the determined credit risk, and to initiate payment of the first bill to the first biller based on the received payment instruction and the selected account, wherein the selection of the account is made independently of the first payor and the first biller.

* * * * *